US012418585B2

(12) United States Patent
Moss

(10) Patent No.: US 12,418,585 B2
(45) Date of Patent: Sep. 16, 2025

(54) SYSTEMS AND METHODS FOR EVALUATING SENSOR DATA FOR OCCUPANCY DETECTION AND RESPONSIVELY CONTROLLING CONTROL DEVICES

(71) Applicant: People Power Company, Palo Alto, CA (US)

(72) Inventor: David Moss, Kirkland, WA (US)

(73) Assignee: People Power Company, Palo Alto, CA (US)

( * ) Notice: Subject to any disclaimer, the term of this patent is extended or adjusted under 35 U.S.C. 154(b) by 0 days.

(21) Appl. No.: 16/279,915

(22) Filed: Feb. 19, 2019

(65) Prior Publication Data

US 2019/0182329 A1    Jun. 13, 2019

Related U.S. Application Data

(63) Continuation-in-part of application No. 15/666,494, filed on Aug. 1, 2017, now Pat. No. 10,976,714.

(Continued)

(51) Int. Cl.
  *H04W 4/33*    (2018.01)
  *G05B 15/02*   (2006.01)
  (Continued)

(52) U.S. Cl.
  CPC ............. *H04L 67/12* (2013.01); *G06N 20/00* (2019.01); *G06N 20/20* (2019.01); *H04L 67/10* (2013.01);
  (Continued)

(58) Field of Classification Search
  CPC .......... H04L 67/12; H04L 67/10; H04W 4/33; H04W 4/70; H04W 4/027; H04W 4/021; G06N 20/00
  See application file for complete search history.

(56) References Cited

U.S. PATENT DOCUMENTS 8,630,741 B1 *   1/2014   Matsuoka ................ F24F 11/88
                                                     700/12
9,353,965 B1 *   5/2016   Goyal ..................... G06F 3/0484
                           (Continued)

OTHER PUBLICATIONS

Amayri, Estimating occupancy in heterogeneous sensor environment, 2016, Energy and Buildings, 46-58 (Year: 2016).*

*Primary Examiner* — Robert E Fennema
*Assistant Examiner* — Vi N Tran
(74) *Attorney, Agent, or Firm* — Sheppard Mullin Richter & Hampton LLP

(57) ABSTRACT

Gathering first data and second data over a communication network, the first data being detected by a first sensor device deployed in a first sub-region of a region, the second data being detected by a second sensor device deployed in a second sub-region of the region. Executing a state detection cloud-bot. Generating a likelihood the region is in a particular state. If the likelihood satisfies a first threshold condition associated with the particular state, initiating one or more first response actions for controlling one or more device actions of at least one Internet-of-Things (IoT) device of a first set of IoT devices. If the likelihood satisfies a second threshold condition associated with the particular state, initiating one or more second response actions for controlling one or more device actions of at least one IoT device of a second set of IoT devices.

22 Claims, 16 Drawing Sheets

Related U.S. Application Data

(60) Provisional application No. 62/689,830, filed on Jun. 25, 2018, provisional application No. 62/658,605, filed on Apr. 17, 2018, provisional application No. 62/631,891, filed on Feb. 18, 2018, provisional application No. 62/535,184, filed on Jul. 20, 2017, provisional application No. 62/405,904, filed on Oct. 8, 2016.

(51) Int. Cl.
*G06N 20/00* (2019.01)
*G06N 20/20* (2019.01)
*H04L 67/10* (2022.01)
*H04L 67/12* (2022.01)
*H04W 4/02* (2018.01)
*H04W 4/70* (2018.01)
*H04W 4/021* (2018.01)

(52) U.S. Cl.
CPC .............. *H04W 4/027* (2013.01); *H04W 4/33* (2018.02); *H04W 4/70* (2018.02); *G05B 15/02* (2013.01); *G05B 2219/2642* (2013.01); *H04W 4/021* (2013.01)

(56) References Cited

U.S. PATENT DOCUMENTS

| | | | |
|---|---|---|---|
| 9,989,942 B2* | 6/2018 | Glickfield | H04L 67/12 |
| 10,054,329 B1* | 8/2018 | Hutz | G08B 25/002 |
| 10,091,278 B1* | 10/2018 | Garlapati | H04W 4/70 |
| 10,764,153 B2* | 9/2020 | McLaughlin | H04W 12/00 |
| 2008/0155059 A1* | 6/2008 | Hardin | H04N 21/816 |
| | | | 709/218 |
| 2012/0186774 A1* | 7/2012 | Matsuoka | F24F 11/30 |
| | | | 165/11.1 |
| 2013/0006390 A1 | 1/2013 | Kreft et al. | |
| 2013/0141018 A1* | 6/2013 | Kamii | H05B 47/11 |
| | | | 315/360 |
| 2013/0289927 A1* | 10/2013 | Smith | G06F 17/18 |
| | | | 702/181 |
| 2014/0217080 A1* | 8/2014 | Hoke | B60L 1/02 |
| 2014/0317029 A1* | 10/2014 | Matsuoka | G05B 15/02 |
| | | | 706/12 |
| 2015/0127712 A1* | 5/2015 | Fadell | G08B 25/008 |
| | | | 709/202 |
| 2015/0134801 A1* | 5/2015 | Walley | H04L 41/0893 |
| | | | 709/223 |
| 2015/0330652 A1* | 11/2015 | Kim | H04W 4/70 |
| | | | 700/276 |
| 2015/0350031 A1* | 12/2015 | Burks | G06F 3/0482 |
| | | | 715/736 |
| 2016/0048114 A1 | 2/2016 | Matthieu | |
| 2016/0095189 A1* | 3/2016 | Vangeel | H05B 41/3921 |
| | | | 315/152 |
| 2016/0099826 A1* | 4/2016 | Logue | G06F 16/258 |
| | | | 709/223 |
| 2016/0147243 A1* | 5/2016 | Micali | G05F 1/66 |
| | | | 700/295 |
| 2016/0196131 A1 | 7/2016 | Searle | |
| 2016/0202677 A1 | 7/2016 | Trundle | |
| 2016/0247370 A1 | 8/2016 | Lamb | |
| 2016/0248847 A1* | 8/2016 | Saxena | H04L 67/18 |
| 2016/0260320 A1* | 9/2016 | Fadell | G08C 17/02 |
| 2016/0342906 A1* | 11/2016 | Shaashua | H04L 67/306 |
| 2016/0350564 A1 | 12/2016 | Nedelcu | |
| 2017/0064550 A1 | 3/2017 | Sundaresan | |
| 2017/0155703 A1 | 6/2017 | Hao et al. | |
| 2017/0170979 A1* | 6/2017 | Khalid | H04L 12/2818 |
| 2017/0171607 A1 | 6/2017 | Britt | |
| 2017/0238176 A1 | 8/2017 | Garcia Morchon et al. | |
| 2017/0301213 A1* | 10/2017 | Davis | G08B 21/22 |
| 2017/0344243 A1* | 11/2017 | Fadell | G05D 23/19 |
| 2017/0359417 A1* | 12/2017 | Chen | H04W 60/04 |
| 2018/0012460 A1* | 1/2018 | Heitz, III | G08B 13/19682 |
| 2018/0066863 A1* | 3/2018 | Hatch | H04W 4/02 |
| 2021/0288832 A1* | 9/2021 | Saxena | G06N 5/025 |

\* cited by examiner

SYSTEMS AND METHODS FOR EVALUATING SENSOR DATA FOR OCCUPANCY DETECTION AND RESPONSIVELY CONTROLLING CONTROL DEVICES

CROSS-REFERENCE TO RELATED APPLICATIONS

The present application claims the benefit of U.S. Provisional Patent Application Ser. No. 62/658,605, filed Apr. 17, 2018 and entitled "System and Method for Occupancy Sleep Detection," and U.S. Provisional Patent Application Ser. No. 62/631,891, filed Feb. 18, 2018 and entitled "Method and System for Distributed Energy Management Services," and is a continuation-in-part of U.S. patent application Ser. No. 15/666,494, filed on Aug. 1, 2017 and entitled "Systems and Methods for Evaluating Sensor Data of Internet-of-Things (IOT) Devices and Responsively Controlling Control Devices," which claims the benefit of U.S. Provisional Patent Application Ser. No. 62/405,904, filed Oct. 8, 2016 and entitled "Components for Ambient Computing Services," and U.S. Provisional Patent Application Ser. No. 62/535,184, filed Jul. 20, 2017 and entitled "Systems and Methods for Evaluating Sensor Data of Internet-of-Things (IOT) Devices and Responsively Controlling Control Devices," which are all hereby incorporated by reference herein. In addition, the present application claims the benefit of U.S. Provisional Patent Application Ser. No. 62/689,830, filed Jun. 25, 2018 and entitled "System and Method for Ambient Activity Detection."

TECHNICAL FIELD

This disclosure pertains to systems for evaluating sensor data. More specifically, this disclosure relates to aggregating sensor data associated with disparate devices, normalizing the aggregated sensor data, using cloud-bot(s) to analyze the normalized sensor data to detect occupants within a region (e.g., a house or other building), and initiating response actions (e.g., controlling a particular IoT device or other device) based on the analysis.

BACKGROUND

Under conventional approaches, home automation systems provide control, monitoring and automation services. For example, traditional home automation systems may include various IoT devices providing different services such as HVAC control, motion sensing, etc. However, these IoT devices and/or services offer limited support to end users.

SUMMARY

Various embodiments of the present disclosure include systems, methods, and non-transitory computer readable media configured to gather, by a cloud-based system, first data and second data over a communication network. The first data is detected by a first sensor device deployed in a first sub-region of a region, and the second data is detected by a second sensor device deployed in a second sub-region of the region. A state detection cloud-bot is executed by the cloud-based system. A likelihood the region is in a particular state is generated by the state detection cloud-bot based on at least a portion of the first data and at least a portion of the second data. If the likelihood satisfies a first threshold condition associated with the particular state, the system initiates by the state detection cloud-bot one or more first response actions of a set of first response actions associated with the first threshold condition. The one or more first response actions control one or more device actions of at least one Internet-of-Things (IoT) device of a first set of IoT devices. If the likelihood satisfies a second threshold condition associated with the particular state, the system initiates by the state detection cloud-bot one or more second response actions of a set of a second response actions associated with the second threshold condition. The one or more second response actions control one or more device actions of at least one IoT device of a second set of IoT devices.

In some embodiments, the first sensor device is a non-IoT device and the second sensor device is an IoT device.

In some embodiments, the region corresponds to a building structure, and the first sub-region corresponds to an outer-doorway of the building structure, and the second sub-region corresponds to one or more rooms of the building structure.

In some embodiments, the state detection cloud-bot comprises a home detection cloud-bot, and the particular state comprises a home state.

In some embodiments, the state detection cloud-bot comprises a sleep detection cloud-bot bot, and the particular state comprises a sleep state.

In some embodiments, the state detection cloud-bot comprises an away detection cloud-bot bot, and the particular state comprises an away state.

In some embodiments, the state detection cloud-bot comprises a vacation detection cloud-bot bot, and the particular state comprises a vacation state.

In some embodiments, the state detection cloud-bot includes a model, and the at least a portion of the first data and at least a portion of the second data comprises real-time input for the model, and the likelihood the region is in a particular state comprises an output of the model. In some embodiments, the model comprises a machine learning model. In some embodiments, the machine learning model comprises a random forests machine learning model.

A claimed solution rooted in computer technology overcomes problems specifically arising in the realm of computer technology. In various embodiments, a computing system is configured to aggregate, normalize, and/or integrate disparate IoT data. For example, IoT data may be gathered from disparate IoT devices (e.g., IoT thermostat devices, IoT humidity devices, IoT security devices) associated with different data formats. Data formats may refer to data types, measurements units, file formats, content formats, schemas, programming languages, and/or the like. The gathered IoT data may be normalized and/or integrated (or, "combined") into a common data format (e.g., a normalized data format) and/or common programming language (e.g., a particular domain-specific programming language).

In some embodiments, one or more cloud-bots may be triggered to analyze (or, "evaluate") IoT data (e.g., raw IoT data, normalized IoT data) associated with multiple IoT devices to determine and initiate one or more response actions (e.g., control actions, notification actions). For example, a cloud-bot may receive temperature data detected by one IoT device associated with a particular data format, detect humidity data from a different IoT device associated with a different data format, and determine a likelihood of mold growth based on a combination of the disparate IoT data detected by the different IoT devices. As discussed elsewhere herein, a cloud-bot may include a set of one or more services (e.g., microservices) configured to execute on a cloud-computing platform.

In some embodiments, a cloud-bot may include a model to determine one or more response actions based on a combination of disparate IoT data. This may allow, for example, the cloud-bot to reach a determination that would otherwise not be reached if only the IoT data of one of the IoT devices (e.g., the IoT humidity device, and not the IoT thermostat) was analyzed. Based on the determination, the cloud-bot may initiate a response action. For example, the cloud-bot may initiate a control action (e.g., reduce temperature setting of associated IoT temperature device) and/or a notification action (e.g., provide a text message to a user device).

Various embodiments of the present disclosure include systems, methods, and non-transitory computer readable media configured to store, by a cloud-based system, a plurality of cloud-bots, each of the plurality of cloud-bots including a respective service. First data is gathered, by the cloud-based system, over a communication network, the first data being associated with a first Internet-of-Things (IoT) device. Second data is gathered, by the cloud-based system over the communication network, the second data being associated with a second IoT device. Execution of a particular cloud-bot of the plurality of cloud-bots is triggered. At least a portion of the first data and at least a portion of the second data is evaluated, by the particular cloud-bot of the plurality of cloud-bots in response to the triggering, against a response condition of a cloud-bot model of the particular cloud-bot. One or more response actions are initiated by the particular cloud-bot of the plurality of cloud-bots in response to satisfaction of the response condition, the one or more response actions controlling one or more device actions of a particular IoT device.

In some embodiments, the first IoT device is associated with a first manufacturer entity, and the second IoT device is associated with a second manufacturer entity different from the first manufacturer entity. In related embodiments, the first data is received from a first cloud-based IoT back-end system associated with the first manufacturer entity, and the second data is received from a second cloud-based IoT back-end system different from the first cloud-based IoT back-end system, the second cloud-based IoT back-end system being associated with the second manufacturer entity.

In some embodiments, the particular IoT device comprises the first IoT device or the second IoT device.

In some embodiments, the particular IoT device is different from the first IoT device and the second IoT device.

In some embodiments, the cloud-bot model receives the at least a portion of the first data as a first input and the at least a portion of the second data as a second input, the cloud-bot model identifying a relationship between the first input and the second input, the relationship causing a satisfaction of the response condition.

In some embodiments, the combination of the at least a portion of the first data and the at least a portion of the second data is sufficient to satisfy the response condition, wherein independently the at least a portion of the first data and the at least a portion of the second data fail to satisfy the response trigger condition.

In some embodiments, the first IoT device and the second IoT device belong to a user of a first account, and the particular IoT device is a control device of a user of a different account.

In some embodiments, the cloud-bot is configured to monitor for false positives of a door sensor.

In some embodiments, the response condition includes a factor based on a phoneless geofence.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

DETAILED DESCRIPTION

Figure 1:
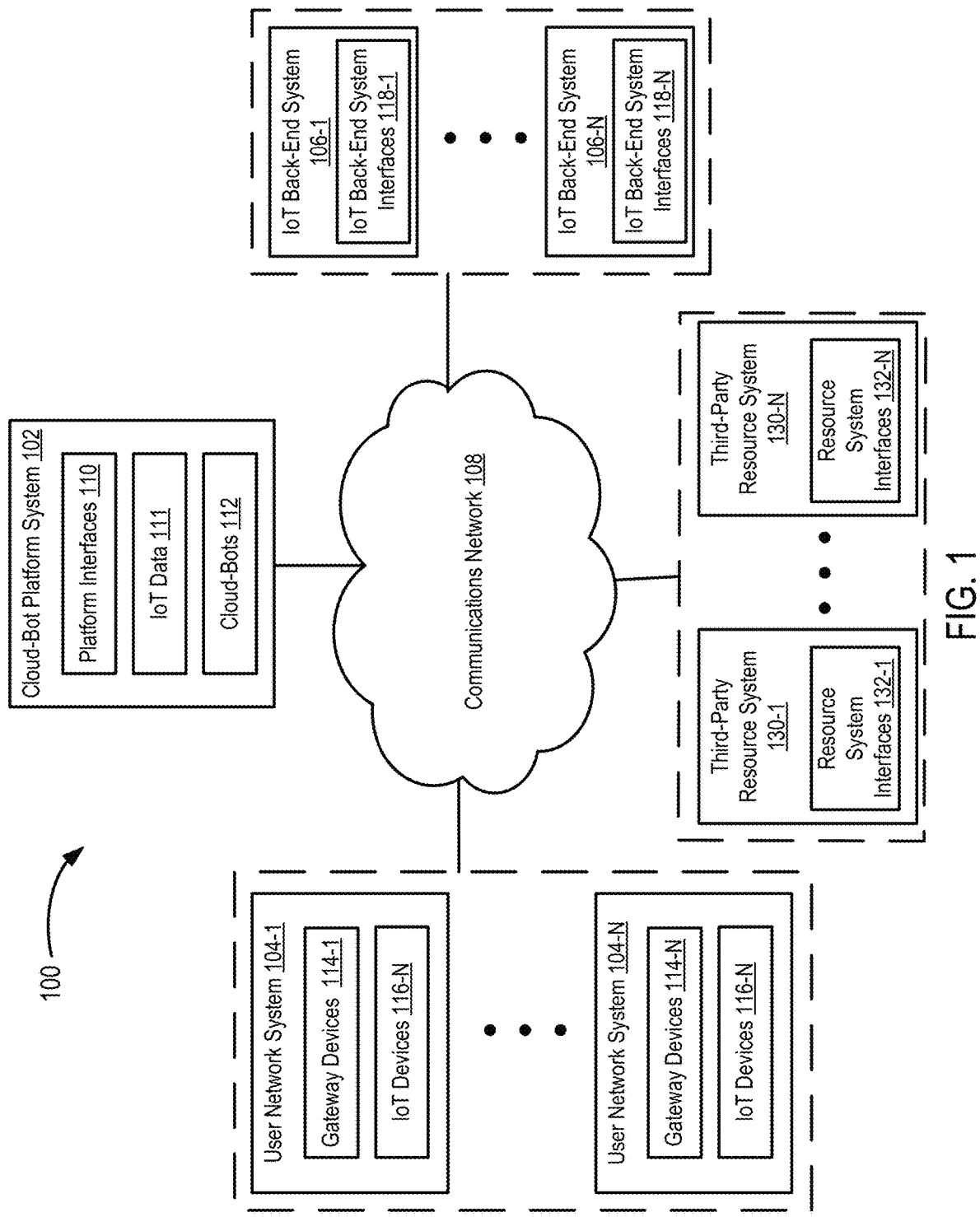
FIG. 1 depicts a diagram of an example environment for deployment and operation of cloud-bots for analyzing disparate IoT data and initiating response actions based thereon according to some embodiments.

Internet-of-Things (IoT) devices may be embedded with electronics, software, sensors, controllers, and communications which allow the IoT devices to detect, transmit, and receive information. For example, an IoT thermostat (e.g., a Nest thermostat device) may monitor sensor data (e.g., temperature data), use circuitry to activate the HVAC system, and communicate the sensor data in a particular format (e.g., a Nest-specified format) to an IoT back-end system (e.g., a Nest cloud-based server system). Similarly, an IoT humidity device (e.g., a Honeywell IoT humidity device) may monitor sensor data (e.g., humidity data), use circuitry to control a humidifier/dehumidifier, and communicate the sensor data in a particular format (e.g., a Honeywell-specified format) to a IoT back-end system (e.g., a Honeywell cloud-based server system). Traditional solutions (e.g., Nest, Honeywell) can independently act on the respective data received from the IoT devices. For example, a Nest back-end system may generate a report on data collected from Nest IoT devices, and a Honeywell back-end system may generate a report on data collected from Honeywell IoT devices.

Embodiments of the current system are capable of evaluating and reacting to sensor data across a combination of disparate IoT devices (e.g., Nest IoT devices and Honeywell IoT devices) of disparate manufacturers, sensor data involving disparate types of IoT devices (e.g., smart thermostats and motion sensor cameras), etc. The current system is capable of changing responsive conditions to address changing environments, risk/threat levels, user preferences/instructions, etc.

A claimed solution rooted in computer technology overcomes problems specifically arising in the realm of computer technology. In various embodiments, a computing system is configured to aggregate, normalize, and/or integrate disparate IoT data. For example, IoT data may be gathered from disparate IoT devices (e.g., IoT thermostat devices, IoT humidity devices, IoT security devices) associated with different data formats. Data formats may refer to data types, measurement units, file formats, content formats, schemas, programming languages, and/or the like. The gathered IoT data may be normalized and/or integrated (or, "combined") into a common data format (e.g., a normalized data format) and/or common programming language (e.g., a particular domain-specific programming language).

In some embodiments, one or more cloud-bots may be triggered to analyze (or, "evaluate") IoT data (e.g., raw IoT data, normalized IoT data) associated with multiple IoT devices to determine and initiate one or more response actions (e.g., control actions, notification actions). For example, a cloud-bot may receive temperature data detected by one IoT device associated with a particular data format, detect humidity data from a different IoT device associated with a different data format, and determine a likelihood of mold growth based on a combination of the disparate IoT data detected by the different IoT devices. As discussed elsewhere herein, a cloud-bot may include a set of one or more services (e.g., microservices) configured to execute on a cloud-computing platform.

In some embodiments, a cloud-bot may include one or more models (e.g., machine learning models) to determine one or more response actions based on a combination of disparate IoT data. This may allow, for example, the cloud-bot to reach a determination that would otherwise not be reached if only the IoT data of one of the IoT devices (e.g., the IoT humidity device, and not the IoT thermostat device) was analyzed. Based on the determination, the cloud-bot may initiate a response action. For example, the cloud-bot may initiate a control action (e.g., reduce temperature setting of a control device of an associated IoT smart thermostat) and/or a notification action (e.g., provide a text message to a user device).

In some embodiments, cloud-bot control actions may depend upon knowing the state (or, mode) of a region (e.g., a house) and/or the occupants relative to the region. For example, a "home" state may indicate at least one person is predicted to be within the region; an "away" state may indicate everyone is predicted to be away from the region (or, that no one is predicted to be within the region); a "sleep" state may indicate everyone within the region is predicted to be sleeping; and a "vacation" state may indicate everyone is predicted to be away from the region for an extended period of time (e.g., at least one day).

In some embodiments, the ability to accurately identify these states may enable cloud-bots to be activated around automated energy management, care, safety, security, and/or other smart home services. In some embodiments, determining state does not rely upon human memory and/or manual human actions. Rather, these states may be identified automatically by interpreting patterns based on machine learning models and/or sensor data (e.g., real-time data and/or historical sensor) detected by one or more sensing devices (e.g., door entry sensors, motion sensors, IoT device sensors).

FIG. 1 depicts a diagram 100 of an example environment for deployment and operation of cloud-bots 112 for analyzing disparate IoT data 111 and initiating response actions based thereon according to some embodiments. In the example of FIG. 1, the environment includes a cloud-bot platform system 102, user network systems 104-1 to 104-N (individually, the user network system 104, collectively, the user network systems 104), IoT back-end systems 106-1 to 106-N (individually, the IoT back-end system 106, collectively, the IoT back-end systems 106), a communication network 108, and third-party resource systems 130-1 to 130-N (individually, the third-party resource system 130, collectively, the third-party resource systems 130).

The cloud-bot platform system 102 may function to gather, aggregate, store, and/or normalize IoT data 111. In various embodiments, functionality of the cloud-bot platform system 102 may be performed by one or more servers, cloud-computing platform, and/or other computing devices. A cloud-computing platform may refer to an on-demand cloud-computing platform, a "serverless" cloud-computing platform, and/or other cloud-computing platform. It will be appreciated that a "serverless" cloud-computing platform may dynamically manage allocation of computing resources, and may still require servers.

In some embodiments, the IoT data 111 may include sensor data (e.g., temperature data, humidity data) detected by IoT devices (e.g., IoT device 116, discussed herein). The cloud-bot platform system 102 may utilize one or more platform interfaces 110 to gather IoT data 111 from one or more remote sources in real-time and/or otherwise (e.g., periodically, according to a schedule, or in response to particular events). The platform interfaces 110 may include application programming interfaces (APIs), software development kits (SDKs), source code, machine code, and/or server stubs. Accordingly, the platform interfaces 110 may include files (e.g., source code files), documents, executables, and/or the like. In some embodiments, the platform interfaces 110 facilitate interaction with remote systems (e.g., user network systems 104, gateway devices 114, IoT devices 116, IoT back-end systems 106, third-party resource systems 130). The platform interfaces 110 may, for example, include server API implementations.

In one example, the cloud-bot platform system 102 may utilize a first set of platform interfaces 110 to gather IoT data 111 from IoT back-end systems 106, a second set of platform interfaces 110 to gather IoT data 111 from gateway devices (e.g., gateway devices 114, discussed herein), and/or a third set of platform interfaces 110 to gather IoT data 111 from IoT devices 116.

In some embodiments, the cloud-bot platform system 102 functions to execute cloud-bots 112. A cloud-bot 112 may include a service (e.g., microservice) and/or set of services. A cloud-bot 112 may include one or more cloud-bot models. For example, cloud-bot models may be static (e.g., "baked" into the service and/or set of services) and/or dynamic (e.g., updated, deleted, and/or otherwise modified prior to, or during, execution of the associated cloud-bot 112). Cloud-bot models may include one or more machine learning models. In one example, a cloud-bot model may receive various independent inputs (e.g., temperature data detected by an IoT thermostat device 116, humidity data detected by an IoT humidity device 116) and determine (e.g., "map") relationships between the various independent inputs. The mapped relationships may, for example, allow a cloud-bot 112 to identify conditions (e.g., likelihood of mold growth) and/or initiate response actions (e.g., reduce temperature of an IoT device) that would otherwise not be possible. For example, a cloud-bot 112 may evaluate mapped inputs against a response condition of the cloud-bot model to determine that one or more response actions should be initiated (e.g., reduce temperature of an IoT device), where separate evaluations of the independent inputs would yield a different determination (e.g., no action needed).

In some embodiments, the cloud-bot platform system 102 facilities on-demand execution of cloud-bots 112. For example, the cloud-bot platform system 102 may deploy a cloud-bot 112 (e.g., within a user account of the cloud-bot platform system 102). A deployed cloud-bot 112 may have several different modes, such as a sleep mode and/or an execute mode. While a cloud-bot 112 is in sleep mode, and/or in any other state (e.g., a non-deployed state), the cloud-bot 112 and/or the cloud-bot platform system 102 may listen for various execution triggers that may trigger the execute mode (e.g., transition from sleep to execute and/or deploy a cloud-bot 112 and execute the cloud-bot). While in execute mode, the cloud-bot 112 may perform execution actions, such as evaluating IoT data 111, determining response actions, initiating response actions, and/or the like. Once the execution actions are completed, or other termination trigger (e.g., a terminate message received from a user device) is detected, the cloud-bot 112 may terminate. In various embodiments, terminating a cloud-bot 112, or terminating execution of a cloud-bot 112, may refer to returning the cloud-bot 112 to sleep mode and/or otherwise quitting execution of the cloud-bot 112 (e.g., shutting down and/or restarting the cloud-bot 112). On-demand execution of cloud-bots 112 may, for example, conserve computing resources.

In some embodiments, the cloud-bot platform system 102 functions to store cloud-bot variables. For example, cloud-bot variables may include variables, objects, parameters, attributes, and/or the like. Cloud-bot variables may store information (e.g., state information) output from one execution of a cloud-bot 112 for utilization in subsequent executions of the same and/or different cloud-bots 112. For example, an IoT security cloud-bot 112 may arm an IoT security device 116 in response to sensor data indicating that a building is empty, and the IoT security cloud-bot 112 may export the state of the IoT security device 116 (e.g., armed) upon, or prior to, termination of the cloud-bot 112. This may allow, for example, cloud-bots 112 to be executed on-demand and terminated without sacrificing functionality (e.g., the ability to save/load information across different executions of cloud-bots 112).

The user network systems 104 may function to provide respective local area networks (LANs), wide-area networks (WANs) and/or other networks including IoT devices 116. The user network systems 104, and the IoT devices 116, may be coupled to the communication network 108 through respective gateway devices 114. For example, the gateway devices 114 may include Wi-Fi routers, modems, and/or the like. In some embodiments, the IoT devices 116 may be directly coupled to the communication network 108 (e.g., via a cellular signal). In some embodiments, groups of user network systems 104 may form "communities" of user network systems 104. In various embodiments, functionality of the user network systems 104 may be performed by one or more gateway device 114, IoT devices 116, desktop computers, laptop computers, mobile devices (e.g., smartphones, tablet computers), servers, and/or other computing devices.

As discussed elsewhere herein, the IoT devices 116 may include a variety of different types of IoT devices 116, such as IoT thermostat devices 116 (e.g., Nest IoT thermostat devices 116), IoT humidity devices 116 (e.g., Honeywell IoT humidity devices 116), IoT security devices 116 (e.g., ADT Pulse IoT devices 116), and/or the like In some embodiments, the IoT devices 116 may include sensors (e.g., temperature sensors, humidity sensors, cameras, microphones), controllers (e.g., actuators that may be intelligently and/or dynamically controlled), communications (e.g., WiFi transceivers, cellular transceivers), and/or the like. The IoT devices 116 may detect sensor data (e.g., IoT data) in a particular data format, store sensor data, provide sensor data to remote systems, and perform control actions in response to control instructions received from remote systems. In various embodiments, an IoT device 116 may refer to a collection of devices forming a particular device (e.g., an IoT Television), and/or it may refer to one or more devices (e.g., a communication component) of a particular device (e.g., an IoT television).

The IoT back-end systems 106 may function to receive, store, and/or provide IoT data detected by associated IoT devices 116. For example, an IoT back-end system 106 associated with a particular manufacturer entity (e.g., Nest) may receive, store, and/or provide IoT data detected by Nest IoT devices 116, another IoT back-end system 106 associated with a different manufacturer entity (e.g., Honeywell) may receive, store and/or provide IoT data detected by Honeywell IoT devices 116, and so forth. In various embodiments, some or all of the IoT back-end systems 106 may be associated with different data formats (e.g., Nest IoT data may be stored according to a different schema than Honeywell IoT data). In some embodiments, functionality of the IoT back-end systems 106 may be performed by one or more servers (e.g., cloud-based servers) and/or other computing devices.

In some embodiments, the IoT back-end systems 106 may function to communicate cooperate, and/or interact with remote systems (e.g., cloud-bot platform system 102, user network systems 104, gateway devices 114, and/or IoT devices 116). For example, the IoT back-end systems 106 may utilize IoT back-end interfaces 118 to facilitate communication, cooperation, and/or interaction with remote systems. The IoT back-end system interfaces 118 may include APIs (e.g., server APIs, client APIs), code (e.g., source code, byte code, or machine code), and/or the like.

The communications network 108 may represent one or more computer networks (e.g., LAN, WAN, or the like) or other transmission mediums. The communication network 108 may provide communication between systems 102-106 and/or other systems described herein. In some embodiments, the communication network 108 includes one or more computing devices, routers, cables, buses, and/or other network topologies (e.g., mesh, and/or the like). In some embodiments, the communication network 108 may be wired and/or wireless. In various embodiments, the communication network 108 may include the Internet, one or more networks that may be public, private, IP-based, non-IP based, and/or the like.

The third-party resource systems 130 may function to provide resources (e.g., electricity, gas, water, and/or the like). For example, the third-party resource systems 130 may comprise systems of one more utility providers (e.g., Pacific Gas and Electric). The third-party resource systems 130 may include one or more resource system interfaces 132 to facilitate communication, cooperation, and/or interaction with remote systems. The resource system interfaces 132 may include APIs (e.g., server APIs, client APIs), code (e.g., source code, byte code, or machine code), and/or the like.

In some embodiments, the cloud-bots 112 may include state (or, mode) detection cloud-bots. A state detection cloud-bot may determine a likelihood (or, probability) that a region (e.g., a house) is in a particular state. For example, a state detection cloud-bot may determine a likelihood (e.g., between 0-100%) that a region is in a "home" state, an "away" state, a "vacation" state, a "sleep" state, and/or a transition state (e.g., a transition between any two of the other states). The state detection cloud-bot may perform various control actions based on the likelihood that the region is in a particular state.

In some embodiments, there is a particular state detection cloud-bot for some or all of the possible states. For example, a home state detection cloud-bot may determine a likelihood the region is in a home state, an away detection cloud-bot may determine a likelihood the region is in an away state, a vacation detection cloud-bot may determine a likelihood the region is in a vacation state, and a sleep detection cloud-bot may determine a likelihood the region is in a sleep state. The different state detection cloud-bots may execute and/or function independently of each other.

In some embodiments, the cloud-bots 112 include an arbiter cloud-bot. The arbiter cloud-bot may resolve conflicts between different state detection cloud-bots. For example, an away detection cloud-bot may indicate that a region has a 70% likelihood of being in an away state, while a sleep detection cloud-bot may indicate the region has a 90% likelihood of being in a sleep state. The arbiter cloud-bot may resolve such a conflict by selecting one of the available states and/or state detection cloud-bots to control the associated region (e.g., either the away detection cloud-bot or the sleep detection cloud-bot).

In some embodiments, the cloud-bots 112 may facilitate resource utilization and/or distribution. For example, if a state detection cloud-bot indicates that a region (e.g., a house and/or group of houses) is in a particular state (e.g., away state or vacation state), the third-party resource systems 130 may provide reduced and/or limited resources to the region. In some embodiments, one or more thresholds may be used to determine whether a region's resource utilization and/or distribution should be affected and/or how much it should be affected. For example, if a region has a threshold likelihood of being in a particular state (e.g., at least 95% likelihood of being in away or vacation state) for a threshold amount of time (e.g., two days), the third-party resource systems 130 may provide reduced and/or limited resources to the region.

Figure 2:
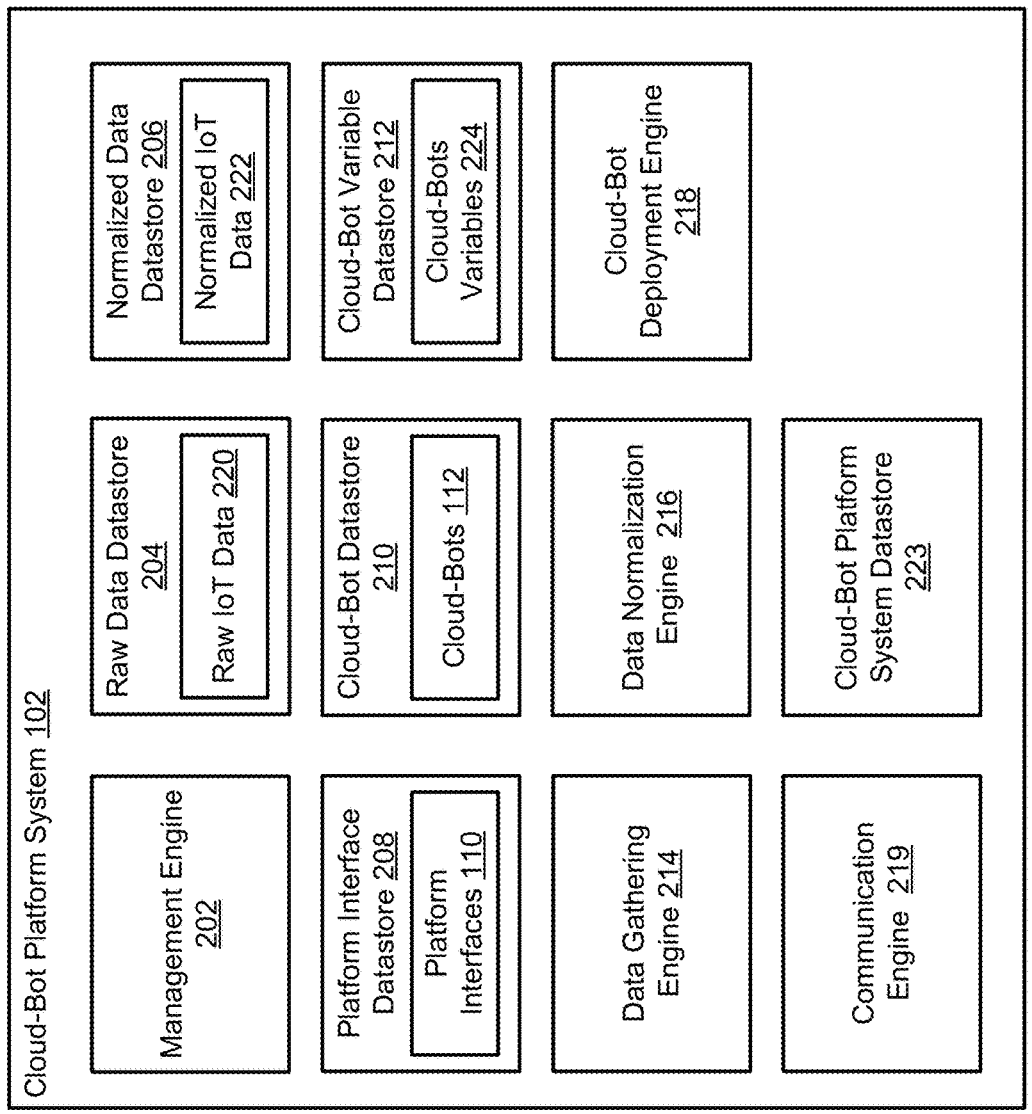
FIG. 2 depicts a diagram of an example of a cloud-bot platform system according to some embodiments.

FIG. 2 depicts a diagram 200 of an example of a cloud-bot platform system 102 according to some embodiments. In the example of FIG. 2, the cloud-bot platform system 102 includes a management engine 202, a raw data datastore 204, a normalized data datastore 206, a platform interface datastore 208, a cloud-bot datastore 210, a cloud-bot variable datastore 212, a data gathering engine 214, a data normalization engine 216, a cloud-bot deployment engine 218, a communication engine 219, and a cloud-bot platform system datastore 223.

The management engine 202 may function to manage (e.g., create, read, update, delete, or otherwise access) raw IoT data 220 stored in the raw data datastore 204, normalized data stored in the normalized data datastore 206, platform interfaces 110 stored in the platform interface datastore 208, cloud-bots 112 stored in the cloud-bot datastore 210, cloud-bot variables 224 stored in the cloud-bot variable datastore 212, and/or other data stored in other datastores (e.g., the cloud-bot platform system datastore 223). The management engine 202 may perform any of these operations manually (e.g., by a user interacting with a GUI) and/or automatically (e.g., triggered by one or more of the engines 214-220, discussed herein). In some embodiments, the management engine 202 includes a library of executable instructions, which are executable by one or more processors for performing any of the aforementioned management operations. Like other engines described herein, functionality of the management engine 202 may be included in one or more other engines (e.g., engines 214-220).

The raw IoT data 220 may include IoT data formatted according to a raw (or, "origin") data format (e.g., a data format associated with an IoT device 116, or a data format associated with an IoT back-end system 106). In some examples, raw IoT data 220 may include tabular schema formatted data, object-oriented schema formatted data, and/or the like. For example, raw IoT data 220 may include data retrieved from IoT devices, database systems, data services, and/or the like. In some embodiments, the raw IoT data 220 may mirror raw IoT data of a source system. In order to maintain an update-to-date mirror, the raw IoT data 220 may be refreshed periodically and/or in real-time.

The normalized IoT data 222 may include data that has been normalized, and/or otherwise transformed, any number of times. For example, the normalized IoT data 222 may be raw IoT data 220 that has been normalized to a particular data format. In some embodiments, normalized IoT data 222 includes raw IoT data 220 that has been normalized to a normalized data format, which may allow, for example, the raw IoT data 220 to be obtained from disparate IoT data sources and maintained in the normalized data datastore 206 with a common data format (e.g., normalized data format).

The data gathering engine 214 may function to gather raw IoT data 220. For example, the data gathering engine 214 may implement one or more platform interfaces 110 to obtain raw IoT data 220 from gateway devices 114, IoT devices 116, and/or IoT back-end systems 106. Gathered raw IoT data 220 may be stored in the raw data datastore 204.

The data normalization engine 216 may function to generate normalized IoT data 222 from the raw IoT data 220. In some embodiments, the data normalization engine 216 may normalize the raw IoT data 220 based on one or more normalization rules. For example, the normalization rules may include functions to transform raw IoT data 220 from a particular data format to a normalized data format, and/or functions to standardize different raw IoT data 220 values and/or values ranges. In some embodiments, the data normalization engine 216 may generate raw IoT data 220 from normalized IoT data 222, and/or generate raw IoT device functions (or, "commands") from normalized IoT functions.

The cloud-bot deployment engine 218 may function to deploy cloud-bots 112 to user accounts of the cloud-bot platform system 102. In some embodiments, cloud-bots 112 may be deployed in response to user input. For example, a user may select one or more cloud-bots 112 from a library of cloud-bots 112 (e.g., stored in the cloud-bot datastore 210), and the cloud-bot deployment engine 218 may deploy the one or more cloud-bots 112 to that user's account. In various embodiments, the cloud-bot deployment engine 218 dynamically manages allocation of computing resources associated with deployed cloud-bots 112.

In some embodiments, the cloud-bot deployment engine 218 deploys cloud-bots 112 non-disruptively. For example, the cloud-bot deployment engine 218 may deploy a cloud-bot 112 to a user's account without having to restart or otherwise interfere with operation of the cloud-bot platform system 102.

In some embodiments, the cloud-bot deployment engine 218 triggers and/or executes cloud-bots 112. Accordingly, the cloud-bot deployment engine 218 may include some or all of the functionality of the cloud-bots 112 discussed herein (e.g., the example cloud-bot 112 discussed below with reference to FIG. 3). For example, the cloud-bot deployment engine 218, and/or other component(s) of the cloud-bot platform system 102, may include the functionality of the trigger engine 302 (discussed below), cloud-bot execution engine 304 (discussed below), and/or the like.

In some embodiments, the cloud-bot deployment engine 218 may deploy and/or execute cloud-bots 112 within a Virtual Private Cloud (VPC). This may, for example, protect various computing resources (e.g., servers) and/or data (e.g., user data, raw IoT data 220, normalized IoT data 222) by inhibiting communications between cloud-bots 112 and third-party systems. In some embodiments, the cloud-bots 112 may be able to communicate with third-party systems (e.g., as long as they have been properly reviewed).

The communication engine 219 may function to send requests, transmit and, receive communications, and/or otherwise provide communication with one or a plurality of systems. In some embodiments, the communication engine 219 functions to encrypt and decrypt communications. The communication engine 219 may function to send requests to and receive data from one or more systems (e.g., gateway devices 114, IoT devices 116, IoT back-end systems 106) through a network or a portion of a network. Depending upon implementation-specified considerations, the communication engine 219 may send requests and receive data through a connection, all or a portion of which may be a wireless connection. The communication engine 219 may request and receive messages, and/or other communications from associated systems. Communications may be stored at least temporarily (e.g., cached and/or persistently) in the cloud-bot platform system datastore 223.

Figure 3:
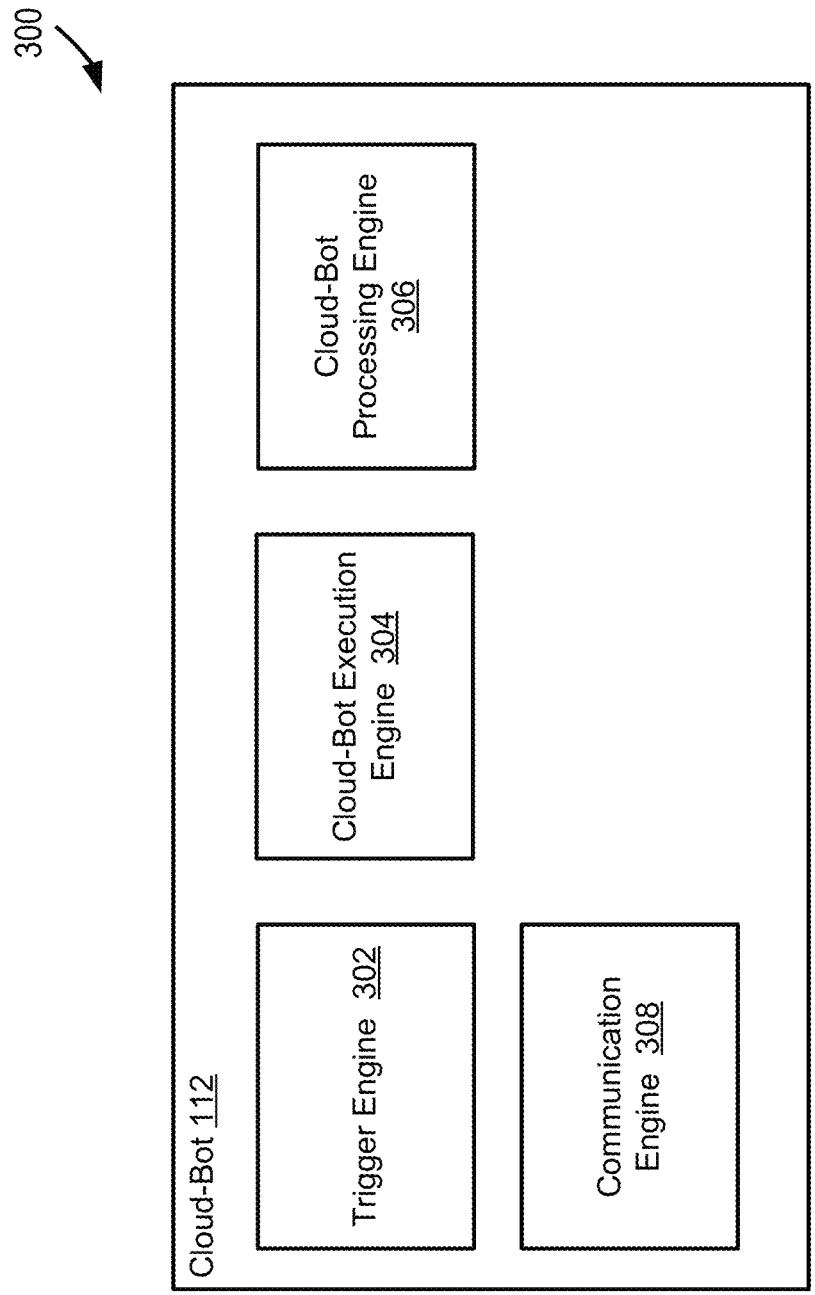
FIG. 3 depicts a diagram of an example of a cloud-bot according to some embodiments.

FIG. 3 depicts a diagram 300 of an example of a cloud-bot 112 according to some embodiments. In the example of FIG. 3, the cloud-bot 112 includes a trigger engine 302, a cloud-bot execution engine 304, a cloud-bot processing engine 306, and a communication engine 308.

The trigger engine 302 may function to schedule and/or define execution triggers. In some embodiments, the trigger engine 302 searches and/or determines cloud-bots 112 to execute (e.g., based on cloud-bot 112 definitions). In some embodiments, execution triggers may include some or all of the following:

Scheduled Execution Triggers: trigger execution of cloud-bots 112 in response to predetermined time-based triggers (e.g., every hour, day, month). For example, scheduled execution triggers may be implemented as one or more Cron expressions.

Manual Execution Triggers: manually trigger execution of cloud-bot 112. For example, a user may manually trigger execution of cloud-bots.

Location Trigger: trigger execution of cloud-bots 112 in response to a change in physical location (e.g., a user leaving a building) and/or virtual location (e.g., an "away" location or "home" location).

Device Alert Triggers: trigger execution of cloud-bots 112 in response to measurements, alerts and/or other messages provided by IoT devices 116, cloud-bots 112 and/or other devices/systems. For example, image data detected by a camera device may trigger a security cloud-bot 112, temperature data and humidity data detected by IoT thermostat devices 116 and IoT humidity devices 116 may trigger a mold detection cloud-bot 112. The device alert triggers may also analyze IoT data and/or conditions to determine whether to execute and/or terminate a cloud-bot 112.

Question Triggers: trigger cloud-bots 112 in response to user answers provided in response to questions presented to a user by cloud-bots 112. For example, a motion sensor of an IoT security device 116 may detect motion in the basement of the user's home, and the cloud-bot 112 may present a question to the user (e.g., "Should anyone be in the basement?"), and based on the answer (e.g., "No"), the cloud-bot 112 may be triggered.

Timer Triggers: trigger cloud-bots 112 in response to automatically and/or manually set countdown timers. For example, a cloud-bot 112 may set itself (or the cloud-bot platform system 102 may set the cloud-bot 112) to be triggered (e.g., 2 minutes after the user exits his home) based on communication with a user (e.g., via answering questions presented through a question). In another example, a security cloud-bot 112 may set a predetermined timer (e.g., 2 minutes) for arming itself upon determining that a building is empty. This may, for example, allow a user to re-enter the building within that predetermined amount of time without triggering an alarm.

Missing

Device File Uploads: Cloud-bot 112 may be triggered based on transmitted and/or received uploads (e.g., a video or picture is captured and uploaded to the cloud, which then triggers the bot to execute to process this media).

Initial Cloud-Bot Instance Deployment: when a cloud-bot 112 gets deployed or upgraded, all instances of that cloud-bot 112 may get triggered to execute any code necessary to transition into a new version of the cloud-bot 112.

The cloud-bot execution engine 304 may function to trigger execution of cloud-bots 112 (e.g., transition from sleep mode to execute mode) and/or trigger termination of the cloud-bot 112 (e.g., transition from execute mode to sleep mode). The cloud-bot execution engine 304 may trigger execution of the cloud-bot 112 in response to execution triggers defined by the trigger engine 302. For example, the cloud-bot execution engine 304 may listen for one or more execution triggers, and trigger execution upon detecting an execution trigger.

In some embodiments, the cloud-bot execution engine 304 defines which execution triggers to listen for, which values and/or types of data/conditions to listen for, and which IoT devices 116 to listen to. For example, a mold-growth cloud-bot 112 may listen for information received from IoT thermostat devices 116 and IoT humidity devices 1116, while a security cloud-bot 112 may listen for information received from IoT camera devices 116 and IoT motion sensor devices 116.

The cloud-bot processing engine 306 may function to load and/or evaluate cloud-bot inputs (e.g., normalized IoT data 222 and/or cloud-bot variables 224). In some embodiments, the cloud-bot processing engine 306 may evaluate cloud-bot inputs against one or more response conditions. For example, a response condition may include one or more threshold conditions (e.g., threshold temperatures, threshold humidity levels) and/or types of raw IoT data (e.g., camera images), that when satisfied, cause the cloud-bot processing 306 to initiate response actions. Response actions may include control actions and/or notification actions. Control actions may include control instructions for controlling one or more devices (e.g., IoT devices 116, and notification actions may include electronic message notifications (e.g., text messages, email messages, audio message, visual messages, haptic messages). Control actions may also include control instructions for one or more other cloud-bots 112 (e.g., a security cloud-bot 112).

In some embodiments, the cloud-bot processing engine 306 may execute cloud-bot models to evaluate cloud-bot inputs against response conditions. For example, a response condition may include a threshold score (e.g., a threshold score indicating a likelihood of mold growth). The cloud-bot processing engine 306 may determine a current score based on a combination of input values (e.g., normalized IoT temperature data 222, normalized IoT humidity data 222). The cloud-bot model may map relationships between the cloud-bot inputs, and based on the mapped relationships, the cloud-bot processing engine 306 may calculate the current score. The cloud-bot processing engine 306, using the cloud-bot model, may compare the current score against the threshold score. Based on the comparison (e.g., if the current score exceeds the threshold score), the cloud-bot processing engine 306 may initiate a response action (e.g., reduce temperature of IoT thermostat device 116 and/or notify a user).

In some embodiments, the response actions may include modifying execution trigger(s) and/or response conditions of the cloud-bot 112. For example, the cloud-bot processing engine 306 may increase the frequency of scheduled execution triggers (e.g., from every day to every hour), add additional execution triggers, remove execution triggers, and/or the like. In some embodiments, a level of modification and/or level of the response actions may be variable. For example, a security cloud-bot may activate additional motions sensors in response to a low-level threat (e.g., one door sensor triggered within a predetermined period of time), or it may trigger an alarm and/or notify a security entity in response to a high-level threat (e.g., multiple motion sensor triggered within a predetermined period of time).

In some embodiments, the cloud-bot processing engine 306 may evaluate cloud-bot inputs against multiple response conditions (e.g., satisfaction of one response condition may trigger an evaluation of one or more additional conditions, and so forth). For example, if a door sensor indicates a door is open, that may trigger an evaluation of living room motion sensor data, which may result in triggering an alarm.

In some embodiments, the cloud-bot processing engine 306 may terminate execution of cloud-bots 112 and/or export cloud-bot variables 224. For example, the cloud-bot processing engine 306 may terminate execution of a cloud-bot 112 after evaluation of cloud-bot inputs and/or initiation of response actions. The cloud-bot processing engine 306 may export cloud-bot variables 224 upon termination, or prior to termination, of the execution of the cloud-bot 112.

The communication engine 308 may function to send requests, transmit and, receive communications, and/or otherwise provide communication with one or a plurality of systems. In some embodiments, the communication engine 308 functions to encrypt and decrypt communications. The communication engine 308 may function to send requests to and receive data from one or more systems (e.g., cloud-bot platform system 102, gateways devices 114, IoT devices 116, IoT back-end systems 106) through a network or a portion of a network. Depending upon implementation-specified considerations, the communication engine 308 may send requests and receive data through a connection, all or a portion of which may be a wireless connection. The communication engine 308 may request and receive messages, and/or other communications from associated systems. For example, the communication engine may receive cloud-bot inputs (e.g., raw data, normalized data, cloud-bot variables) and/or export cloud-bot outputs (e.g., response action data, cloud-bot variables).

Figure 4:
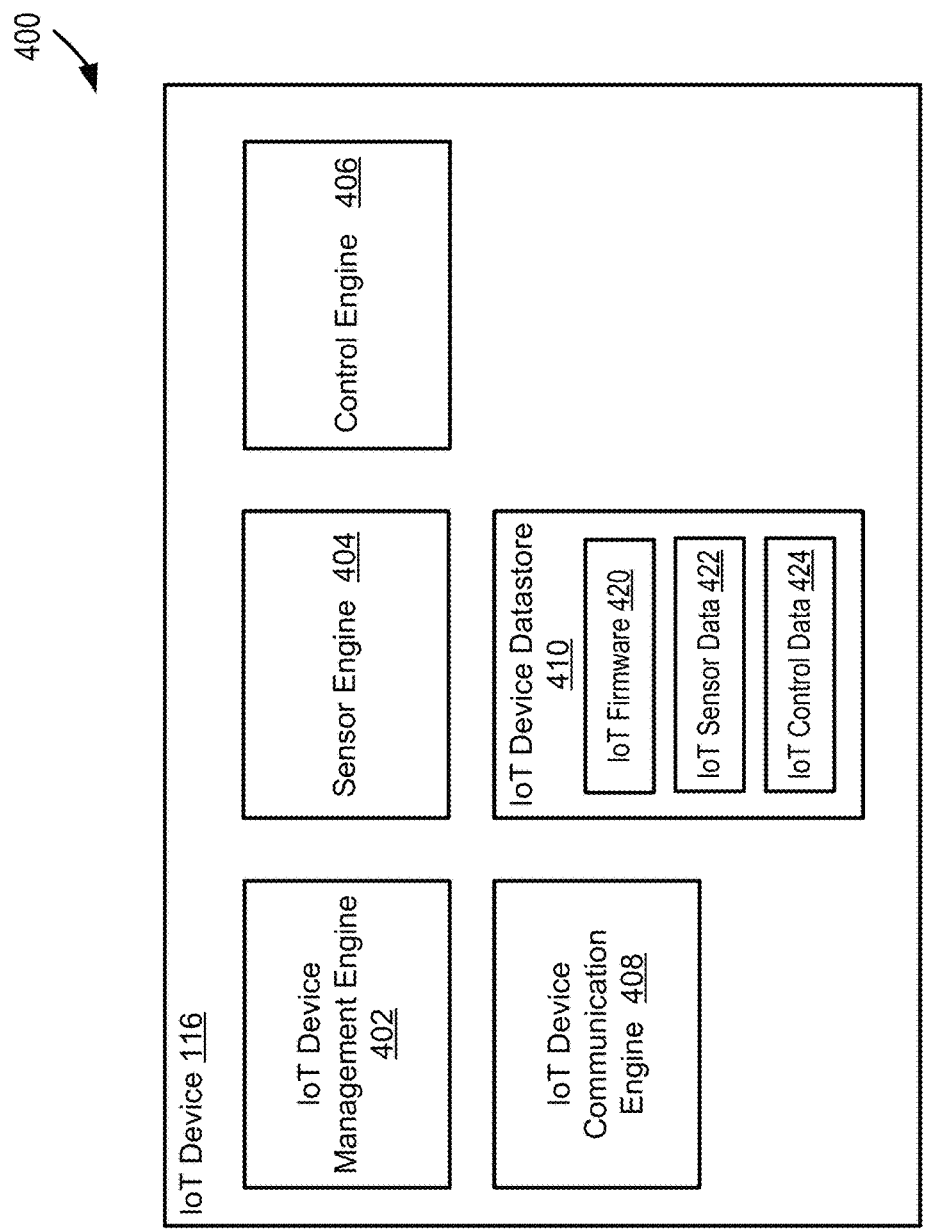
FIG. 4 depicts a diagram of an example of an IoT device according to some embodiments.

FIG. 4 depicts a diagram 400 of an example of an IoT device 116 according to some embodiments. In the example of the FIG. 4, the IoT device 116 includes an IoT device management engine 402, a sensor engine 404, a control engine 406, an IoT device communication engine 408, and an IoT device datastore 410.

The IoT device management engine 402 may function to manage (e.g., create, read, update, delete, or otherwise access) IoT firmware 420 stored in the IoT device datastore 410, IoT sensor data 422 stored in the IoT device datastore 410, and/or the IoT control data 424 stored in the IoT device datastore 410. The IoT device management engine 402 may perform any of these operations manually (e.g., by a user interacting with a GUI) and/or automatically (e.g., triggered by one or more of the engines 404-408, discussed herein). In some embodiments, the IoT device management engine 402 includes a library of executable instructions, which are executable by one or more processors for performing any of the aforementioned management operations.

The sensor engine 404 may function to detect IoT sensor data 422. For example, the sensor engine 404 may detect raw IoT sensor data 422 using one or more physical sensors (e.g., temperature sensors, humidity sensors, motion sensors, cameras, microphones). In some embodiments, the IoT sensor data 422 may be stored, at least temporarily, in the IoT device datastore 410.

The control engine 406 may function to perform control actions. For example, control actions may include adjusting temperature, locking and/or unlocking doors, video recording, and/or the like. Control actions may be performed based on response actions initiated by remote systems (e.g., a cloud-bot 112). Results of control actions (e.g., door unlocked) may be stored as IoT control data 424 in the IoT device datastore 410.

The IoT device communication engine 408 may function to send requests, transmit and, receive communications, and/or otherwise provide communication with one or a plurality of systems. In some embodiments, the IoT device communication engine 408 functions to encrypt and decrypt communications. The IoT device communication engine 408 may function to send requests to and receive data from one or more systems (e.g., cloud-bot platform system 102, gateway devices 114, IoT back-end systems 106) through a network or a portion of a network. Depending upon implementation-specified considerations, the IoT device communication engine 408 may send requests and receive data through a connection, all or a portion of which may be a wireless connection. The IoT device communication engine 408 may request and receive messages, and/or other communications from associated systems. For example, the communication engine may receive IoT firmware 420 updates, provide IoT sensor data 422, receive IoT control data 424, and/or the like.

The IoT firmware 420 may function to provide control, monitoring, communication, and/or data manipulation for the IoT device 116. In some embodiments, the IoT firmware 420 may function to facilitate communication, cooperation, and/or interaction with remote systems (e.g., gateway devices 114, cloud-bot platform system 102, IoT back-end systems 106). For example, the IoT firmware 420 may interact with a platform interface 110 to provide communication between the IoT device 116 and the cloud-bot platform system 102 through the communication network 108.

Figure 5:
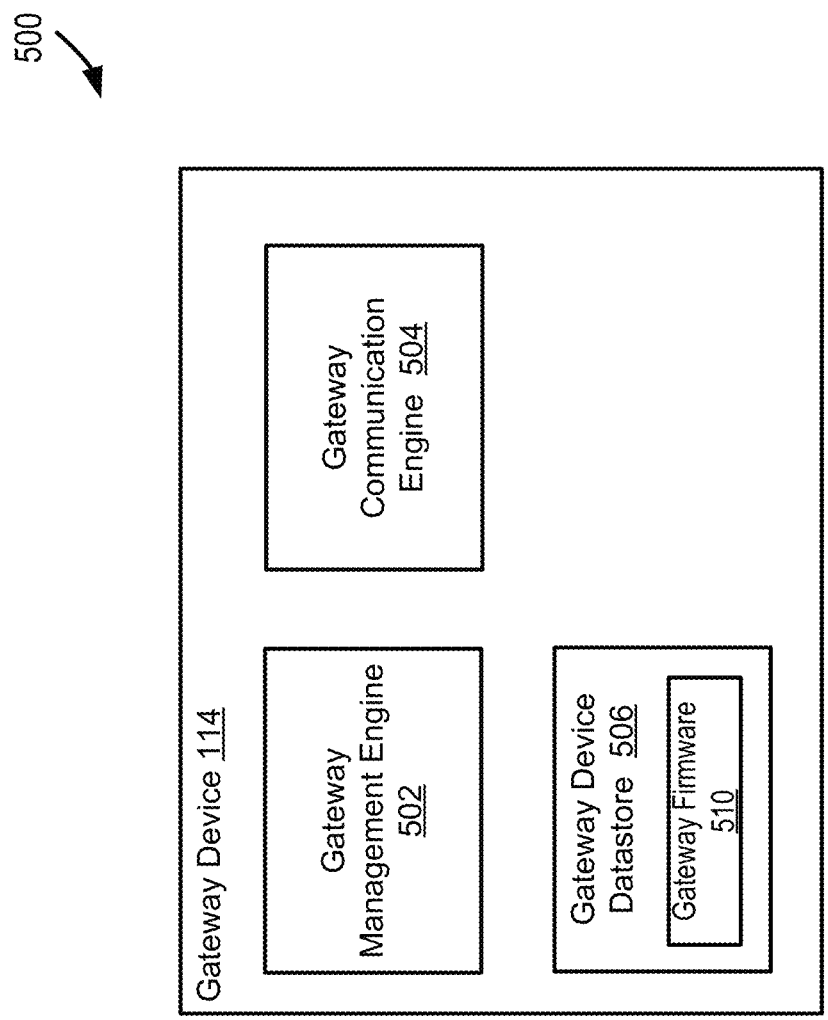
FIG. 5 depicts a diagram of an example of a gateway device according to some embodiments.

FIG. 5 depicts a diagram 500 of an example of a gateway device 114 according to some embodiments. In the example of FIG. 5, the gateway device 114 includes a gateway management engine 502, a gateway communication engine 504, and a gateway device datastore 506.

The gateway management engine 502 may function to manage (e.g., create, read, update, delete, or otherwise access) gateway firmware 510 stored in the gateway device datastore 508. The gateway management engine 502 may perform any of these operations manually (e.g., by a user interacting with a GUI) and/or automatically (e.g., triggered by the gateway communication engine 504, discussed herein). In some embodiments, the gateway management engine 502 includes a library of executable instructions, which are executable by one or more processors for performing any of the aforementioned management operations.

The gateway firmware 510 may function to provide control, monitoring, communication, and/or data manipulation for the gateway device 114. In some embodiments, the gateway firmware 510 may function to facilitate communication, cooperation, and/or interaction with remote systems (e.g., IoT devices 116, cloud-bot platform system 102, IoT back-end systems 106). For example, the gateway firmware 510 may interact with a platform interface 110 to provide communication between the IoT devices 116 and the cloud-bot platform system 102 through the communication network 108.

The gateway communication engine 504 may function to facilitate network connectivity (e.g., Wi-Fi) between IoT devices 116 and one or more remote systems (e.g., cloud-bot platform system 102 and/or IoT back-end systems 106). In some embodiments, the gateway communication engine 504 may send requests, transmit and, receive communications, and/or otherwise provide communication with one or a plurality of systems. In some embodiments, the gateway communication engine 504 functions to encrypt and decrypt communications. The gateway communication engine 504 may function to send requests to and receive data from one or more systems (e.g., cloud-bot platform system 102, IoT device 116, IoT back-end systems 106) through a network or a portion of a network. Depending upon implementation-specified considerations, the gateway communication engine 504 may send requests and receive data through a connection, all or a portion of which may be a wireless connection. The gateway communication engine 504 may request and receive messages, and/or other communications from associated systems.

Figure 6:
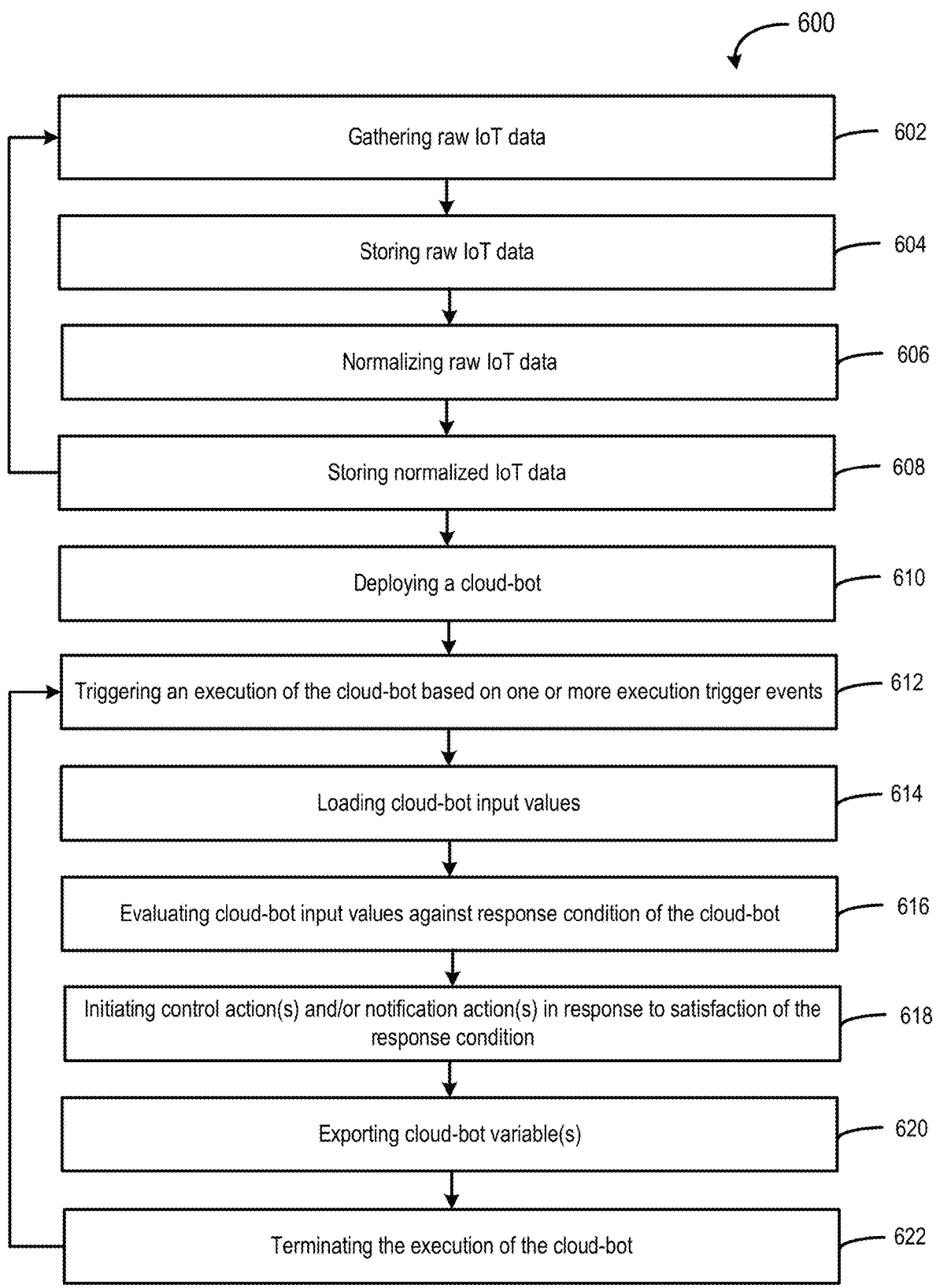
FIG. 6 depicts a flowchart of an example of a method of deployment and operation of a cloud-bot according to some embodiments.

FIG. 6 depicts a flowchart 600 of an example of a method of deployment and operation of a cloud-bot (e.g., cloud-bot 112) according to some embodiments. In this and other flowcharts, the flowchart illustrates by way of example a sequence of steps. It should be understood the steps may be reorganized for parallel execution, or reordered, as applicable. Moreover, some steps that could have been included may have been removed for the sake of clarity and some steps that were included could be removed, but may have been included for the sake of clarity.

In step 602, a cloud-bot platform system (e.g., cloud-bot platform system 102) gathers raw IoT data (e.g., raw IoT data 220). For example, the cloud-bot platform system may gather raw IoT data from one or more IoT back-end systems (e.g., IoT back-end systems 106), gateway devices (e.g., gateway devices 114), and/or IoT devices (e.g., IoT devices 116). In some embodiments, a data gathering engine (e.g., data gathering engine 214) gathers the raw IoT data. The data gathering engine may utilize one or more platform interfaces (e.g., platform interfaces 110 stored in the platform interface datastore 208) to interact with the one or more IoT back-end systems, gateway devices, and/or IoT devices. For example, the platform interfaces may cooperate with IoT back-end interfaces (e.g., IoT back-end interfaces 118), gateway device firmware (e.g., gateway firmware 510), and/or IoT device firmware (e.g., IoT firmware 420), to gather the IoT data over a communication network (e.g., communication network 108). In some embodiments, a communication engine (e.g., communication engine 219) may provide and/or facilitate communication over the communication network.

In step 604, the cloud-bot platform system stores the raw IoT data. In some embodiments, a management engine (e.g., management engine 202) stores the raw IoT data in a raw data datastore (e.g., raw data datastore 204).

In step 606, the cloud-bot platform system normalizes the raw IoT data to create normalized IoT data (e.g., normalized IoT data 222). For example, the cloud-bot platform system may normalize the raw IoT data based on a common model and/or common programming language (e.g., a domain-specified programming language). Accordingly, the normalized IoT data may have the same (or substantially similar) normalized data format(s) and/or normalized values/ranges. This may facilitate, for example, integration and/or evaluation of IoT data associated with disparate IoT devices (e.g., Nest IoT devices, Honeywell IoT devices, ADT Pulse IoT devices). In some embodiments, a data normalization engine (e.g., data normalization engine 216) normalizes the IoT data.

In step 608, the cloud-bot platform system stores the normalized IoT data. In some embodiments, the management engine stores the normalized IoT data in a normalized data datastore (e.g., normalized data datastore 206).

In various embodiments, some or all of the steps 602-608 to may be repeated (e.g., periodically, based on a schedule, in response to particular events). This may allow, for the example, the cloud-bot platform system to receive current IoT data (e.g., based on a schedule, on-demand, and/or in real-time).

In step 610, the cloud-bot platform system deploys a cloud-bot (e.g., cloud-bot 112). For example, the cloud-bot platform system may deploy the cloud-bot to a user account (e.g., user account of the cloud-bot platform system and/or related cloud-based system(s)). The cloud-bot platform system may deploy the cloud-bot in a particular mode (e.g., sleep mode or execute mode). In some embodiments, a cloud-bot deployment engine (e.g., cloud-bot deployment engine 218) deploys the cloud-bot.

In step 612, the cloud-bot triggers an execution of the cloud-bot based on one or more execution triggers. For example, the cloud-bot may listen for one or more execution triggers, and transition to an execute mode in response to one or more execution triggers. In some embodiments, a trigger engine (e.g., trigger engine 302) defines the execution triggers, and a cloud-bot execution engine (e.g., cloud-bot execution engine 304) triggers the execution of the cloud-bot.

In step 614, the cloud-bot loads one or more cloud-bot input values (e.g., cloud-bot variables 224). For example, the cloud-bot input values may include normalized IoT data associated with disparate IoT devices (e.g., Nest IoT devices, Honeywell IoT devices, ADT Pulse IoT devices) and/or cloud-bot variables (e.g., cloud-bot variables 224). The cloud-bot variables may allow the current execution of the cloud-bot to access data of prior executions of the cloud-bot (e.g., output/result data). In some embodiments, a cloud-bot processing engine (e.g., cloud-bot processing engine 306) loads the one or more cloud-bot input values. For example, the cloud-bot processing engine may load the cloud-bot input values into a cloud-bot model of the cloud-bot.

In step 616, the cloud-bot evaluates the cloud-bot input values against a response condition of the cloud-bot. For example, a response condition may include a threshold score (e.g., a threshold score indicating a likelihood of mold growth). The cloud-bot may determine a current score based on the combination of input values. For example, the cloud-bot model may map relationships between the cloud-bot input values, and based on the mapped relationships, the cloud-bot may calculate the current score. The cloud-bot may compare the current score against the threshold score to determine whether the response condition is satisfied. In some embodiments, the cloud-bot processing engine performs the evaluation.

In step 618, the cloud-bot initiates one or more control actions and/or notification actions in response to satisfaction of the response condition. In some embodiments, the cloud-bot processing engine initiates the one or more control actions and/or notification actions. In some embodiments, the cloud-bot processing engine may cause communication between the cloud-bot platform system and one or more IoT devices and/or gateways, and/or may convert commands from normalized commands to device specific raw format commands.

In step 620, the cloud-bot exports a set of cloud-bot variables. For example, the cloud-bot may export state information. In some embodiments, the cloud-bot processing engine exports the cloud-bot variables.

In step 622, the cloud-bot terminates the execution of the cloud-bot. For example, the cloud-bot may transition to a sleep mode and/or otherwise quit/exit. The cloud-bot may terminate execution of the cloud-bot in response to one or more termination triggers (e.g., exported the cloud-bot variables and/or initiated the control/notification actions). In some embodiments, the cloud-bot execution engine and/or cloud-bot processing engine terminates the execution of the cloud-bot.

In various embodiments, some or all of the steps 612-622 may be repeated for subsequent executions of the cloud-bot. For example, the cloud-bot variables exported in step 622 may be used as input values for subsequent executions of the cloud-bot.

Figure 7:
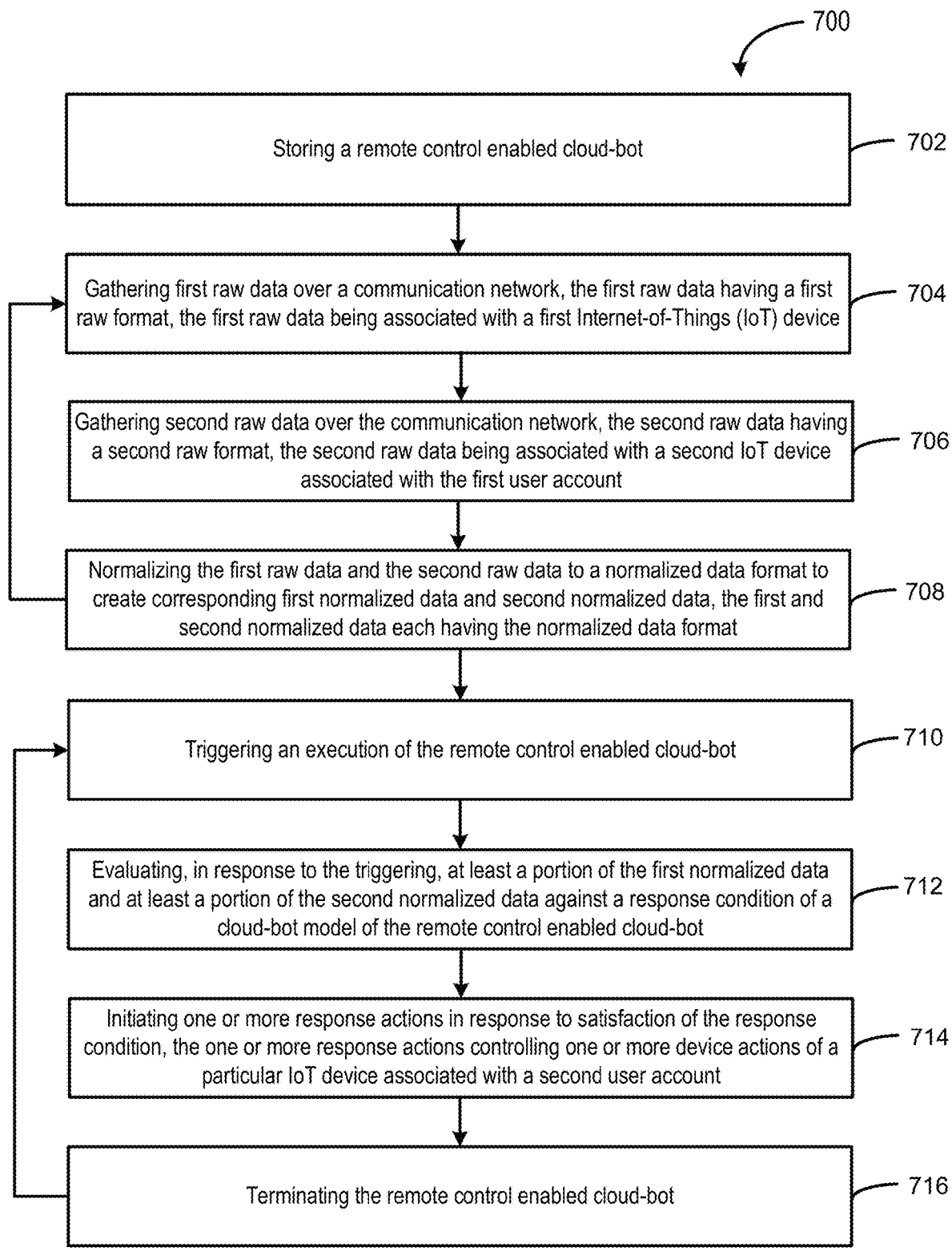
FIG. 7 depicts a flowchart of an example of a method of deployment and operation of a remote-control-enabled cloud-bot according to some embodiments.

FIG. 7 depicts a flowchart 700 of an example of a method of deployment and operation of a remote-control-enabled cloud-bot according to some embodiments. In some embodiments, a remote-control-enabled cloud-bot (e.g., a particular type of security cloud-bot 112) associated with a particular user may be capable controlling devices (e.g., IoT devices 116) of one or more other users (e.g., a neighbor) in addition to the devices (e.g., IoT devices 116) of the particular user.

In step 702, a cloud-based system (e.g., cloud-bot platform system 102) stores a remote-control-enabled cloud-bot (e.g., remote-control-enabled cloud-bots 112). In some embodiments, a management engine (e.g., management engine 202) stores the remote-control-enabled cloud-bot in a datastore (e.g., cloud-bot datastore 210).

In step 704, the cloud-based system gathers first raw data (e.g., raw motion sensor data 220) over a communication network (e.g., communication network 108). The first raw data may have a first raw format. The first raw data may be detected by a first IoT device (e.g., an ADT Pulse IoT device 116) associated with a first user account. For example, the first user account may be associated with a user network system deployed in the user's residence (e.g., user network system 104-1). In some embodiments, a data gathering engine (e.g., data gathering engine 214) gathers the first raw data.

In step 706, the cloud-based system gathers second raw data (e.g., raw smart lock data) over the communication network. The second raw data may have a second raw format (e.g., a Kwikset-specified data format). The second raw data may be detected by a second IoT device (e.g., a Kwikset IoT smart lock device 116) associated with the first user account. In some embodiments, the data gathering engine gathers the second raw data.

In step 708, the cloud-based system normalizes the first raw data and the second raw data to a normalized data format to create corresponding first normalized data and second normalized data. The first and second normalized data may each having the normalized data format. In some embodiments, a data normalization engine (e.g., data normalization engine 216) normalizes the first and second raw data.

In step 710, the remote-control-enabled cloud-bot triggers an execution of the remote-control-enabled cloud-bot. For example, the remote-control-enabled cloud-bot, while in a sleep mode or other non-executing mode, may listen for one or more execution triggers. The remote-control-enabled cloud-bot may trigger an execution in response to one or more of the execution triggers. In some embodiments, a cloud-bot execution engine (e.g., cloud-bot execution engine 304) triggers the execution.

In some embodiments, the cloud-bot platform system triggers the execution of the remote control-enabled cloud-bot. For example, a cloud-bot deployment engine (e.g., cloud-bot deployment engine 218) may trigger the execution.

In step 712, the remote-control-enabled cloud-bot evaluates at least a portion of the first normalized data and at least a portion of the second normalized data against a response condition of a cloud-bot model of the remote-control-enabled cloud-bot. In some embodiments, a cloud-bot model receives the at least a portion of the first normalized data as a first input and the at least a portion of the second normalized data as a second input. The cloud-bot model may identify a relationship between the first input and the second input, and may determine a satisfaction of the response condition based on the relationship. In some embodiments, a cloud-bot processing engine (e.g., cloud-bot processing engine 306) performs the evaluation.

In step 714, the remote-control-enabled cloud-bot initiates one or more response actions in response to satisfaction of the response condition. The one or more response actions may control one or more device actions of a particular IoT device associated with a second user account. For example, the second user account may be associated with a second user network system (e.g., user network system 104-2) deployed at the residence of the second user (e.g., the neighbor of the first user). The response action may instruct an IoT security camera device of the second user network located across the street from the first user's residence to activate. In some embodiments, the cloud-bot processing engine initiates the one or more response actions.

In step 716, the remote-control-enabled cloud-bot terminates execution of the remote-control-enabled cloud-bot (e.g., transitions to sleep mode). In some embodiments, the cloud-bot execution engine and/or cloud-bot processing engine terminates execution of the cloud-bot.

In some embodiments, the cloud-bot platform system terminates the execution of the remote control-enabled cloud-bot. For example, the cloud-bot deployment engine may trigger the execution.

Figure 8:
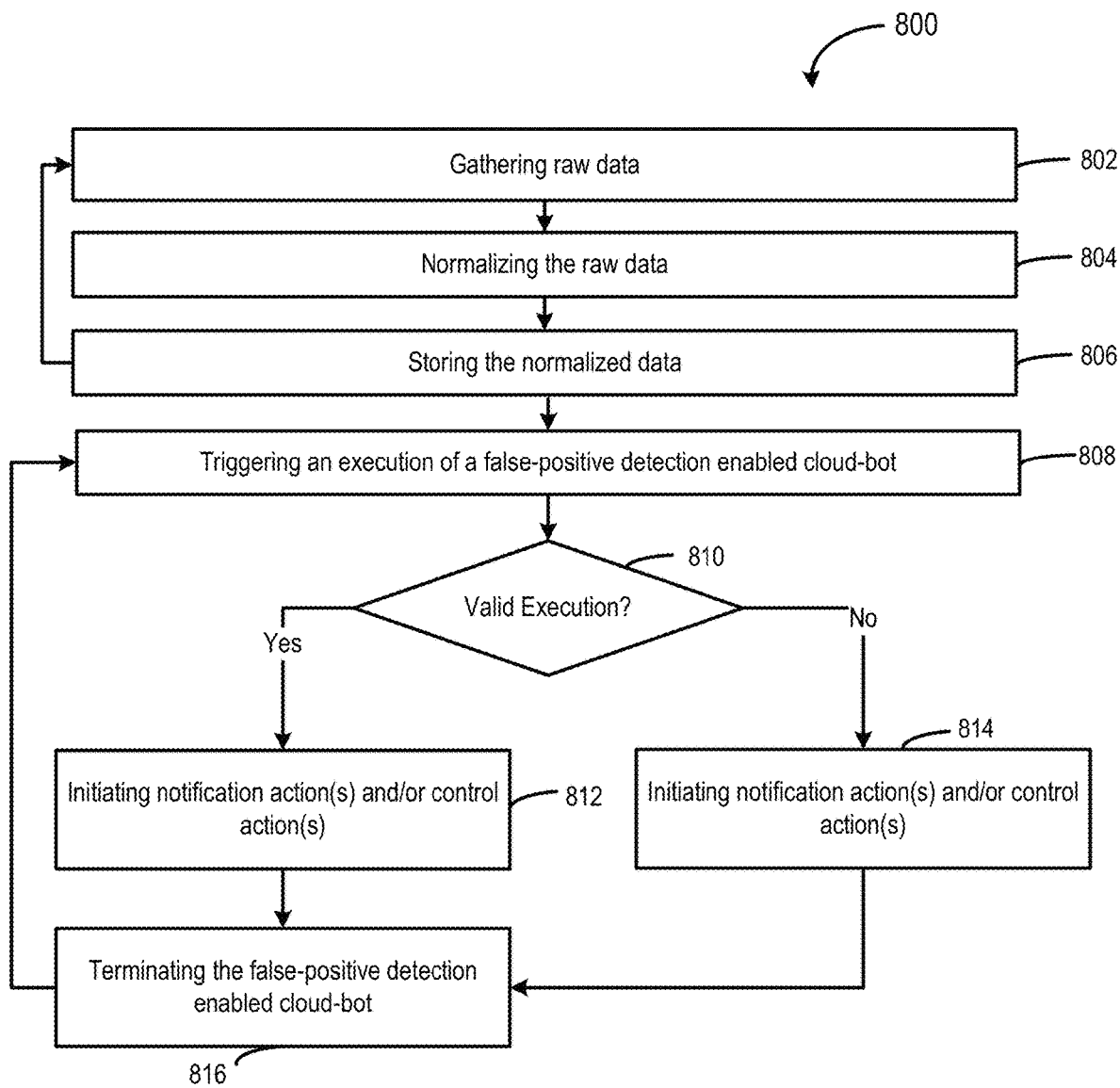
FIG. 8 depicts a flowchart of an example of a method of deployment and operation of a false-positive-detection cloud-bot according to some embodiments.

FIG. 8 depicts a flowchart 800 of an example of a method of deployment and operation of a false-positive-detection enabled cloud-bot according to some embodiments. In some embodiments, a false-positive-detection-enabled cloud-bot (e.g., a particular type of security cloud-bot 112) may be capable of distinguishing between valid and invalid execution triggers. For example, a door sensor may detect motion (e.g., door moves from a closed position towards an open position), but the false-positive-detection-enabled cloud-bot may prevent/terminate any alarm subsequently detects motion indicating that the door has returned to the closed position with a predetermined amount of time less than needed for a human to enter the home (e.g., 2 seconds). The false-positive-detection-enabled cloud-bot may terminate/prevent execution of the cloud-bot, may review other IoT data such as interior motion data for confirmation, and/or may change the schedule with which it performs evaluations.

In step 802, a cloud-based system (e.g., cloud-bot platform system 102) gathers raw data (e.g., raw IoT data 220) over a communication network (e.g., communication network 108). For example, the raw data may include motion data (e.g., opening/closing of a door, movement of individuals within a particular physical location). The raw data may have different data formats. The raw data may have been detected by one or more sensor engines (e.g., sensor engine 404) of one or more IoT devices (e.g., IoT devices 116). For example, the IoT devices may include IoT security devices and/or other types of IoT devices deployed in the same and/or different physical locations (e.g., a door/doorway, living room). In some embodiments, a data gathering engine (e.g., data gathering engine 214) gathers the raw data.

In step 804, the cloud-based system normalizes the raw data to a normalized data format to create normalized data. In some embodiments, a data normalization engine (e.g., data normalization engine 216) normalizes the raw data.

In step 806, the cloud-based system stores the normalized data. In some embodiments, a management engine (e.g., management engine 202) stores the normalized data in a normalized data datastore (e.g., normalized data datastore 206).

In various embodiments, some or all of the steps 802-806 may be repeated. Accordingly, the cloud-based system may gather, normalize, and store data continuously, periodically, on-demand, in real-time, and/or the like. In some embodiments, data may be timestamped and/or stored persistently. For example, the most recent data (e.g., as determined by respective timestamps) may be referred to as "current" data, while older data (e.g., as determined by respective timestamps) may be referred to as historical data.

In step 808, a cloud-bot (e.g., a false-positive-detection-enabled cloud-bot 112) triggers an execution of the cloud-bot. For example, while in a sleep mode or other non-executing mode, the cloud-bot may listen for an execution trigger (e.g., movement/motion of a door), and upon detection of the execution trigger, the cloud-bot may execute. In some embodiments, a cloud-bot execution engine (e.g., cloud-bot execution engine 304) triggers the execution of the cloud-bot.

In some embodiments, the cloud-bot platform system triggers the execution of the cloud-bot. For example, a cloud-bot deployment engine (e.g., cloud-bot deployment engine 218) may trigger the execution.

In step 810, the cloud-bot determines whether the execution of the cloud-bot is valid. In some embodiments, the cloud-bot may trigger a countdown timer (e.g., 2 seconds) and compare first timestamped normalized data associated with the start of the countdown timer with second timestamped normalized data associated with the end of the countdown timer. If the first timestamped normalized data indicates first information/state (e.g., door closed) different from a second information/state (e.g., door open) indicated by the second timestamped normalized data, the cloud-bot may determine the execution trigger is valid, and continue executing the cloud-bot, and initiate one or more notification and/or control actions (step 812). For example, the cloud-bot may cooperate with one or more associated IoT devices (e.g., an ADT IoT device) and/or function independently to notify a user or other entity (e.g., ADT), control an alarm, and so forth.

Otherwise, if the first timestamped normalized data indicates first information/state (e.g., door closed) that is the same as the second information/state (e.g., door closed) indicated by the second timestamped normalized data, the cloud-bot may determine the execution triggering is invalid (e.g., a false-positive). In various embodiments, a cloud-bot processing engine (e.g., cloud-bot processing engine 306) determines whether the execution of the cloud-bot is valid.

In step 814, the cloud-bot, in response to determining the triggering is invalid, initiates one or more control actions and/or notification actions. For example, the cloud-bot may provide a notification to a user indicating the presence of false-positive(s) that may enable the user to take remedial action (e.g., stabilizing the door). In some embodiments, the cloud-bot may require additional input values to determine a valid triggering in subsequent executions of the cloud-bot. For example, the current execution may only rely on an open door determination in order to initiate security control and/or notification actions (e.g., contact security entity, police, and/or the like), while subsequent executions after a false-positive determination may require data from other sensors (e.g., a sensor in the living room indicating motion) in order to initiate security control and/or notification actions. In some embodiments, the cloud-bot may trigger one or more other sensors or IoT devices. For example, the cloud-bot may turn on additional motion sensor(s) (e.g., a motion sensor in the living room) that were not active prior to determining a false positive.

In step 816, the cloud-bot terminates execution. In some embodiments, the cloud-bot processing engine terminates execution. In some embodiments, the cloud-bot platform system terminates the execution of the cloud-bot. For example, a cloud-bot deployment engine may terminates the execution.

Figure 9:
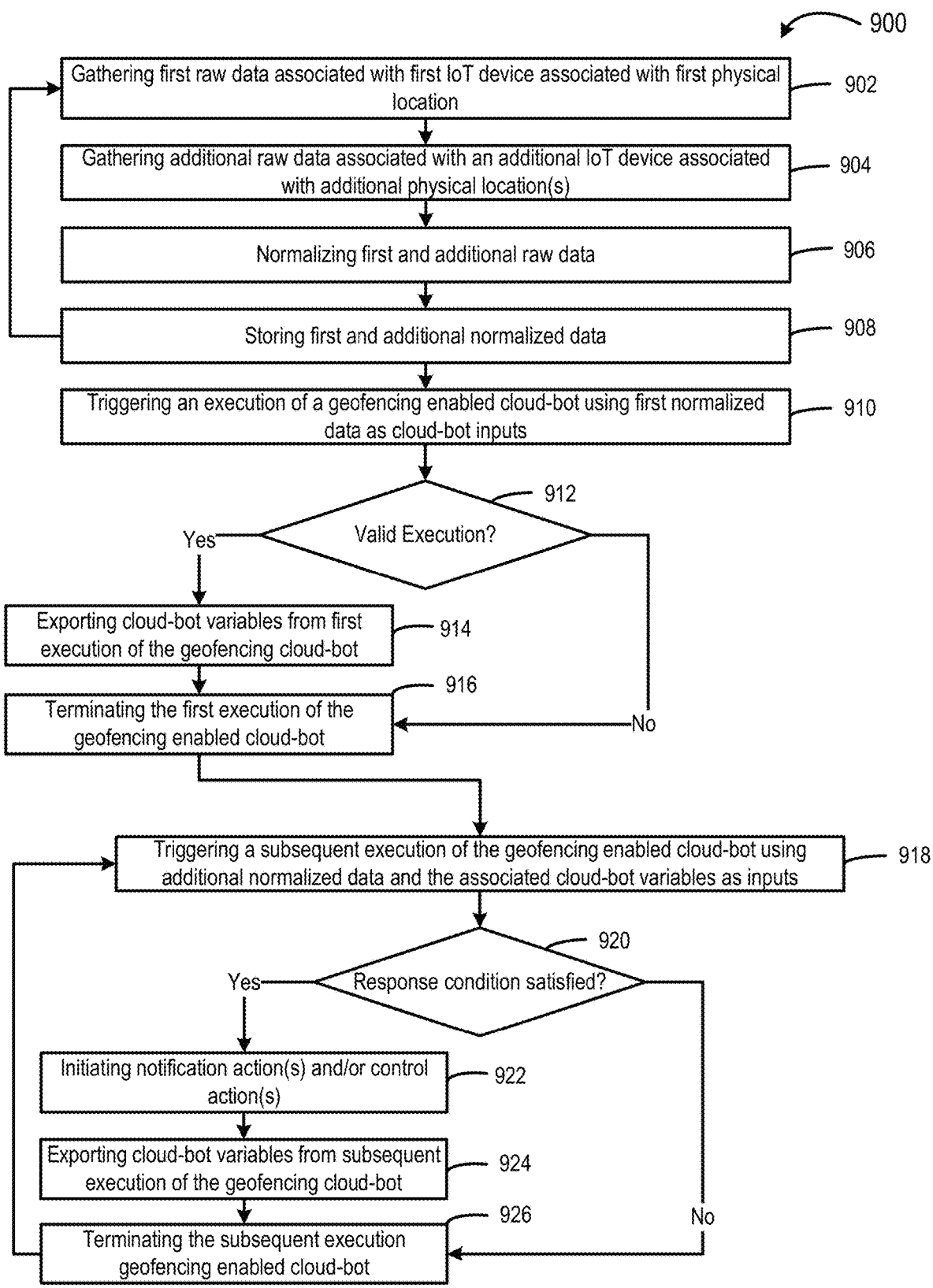
FIG. 9 depicts a flowchart of an example of a method of deployment and operation of a geofencing-enabled cloud-bot according to some embodiments.

FIG. 9 depicts a flowchart 900 of an example of a method of deployment and operation of a geofencing-enabled cloud-bot according to some embodiments. In some embodiments, geofencing-enabled cloud-bots may automatically determine presence and/or locations of geofencing subjects (e.g., humans, pets, etc.) without requiring smartphones and/or other mobile devices. For example, geofencing enabled cloud-bots may be used to arm a home security system when all geofencing subjects have left the home, adjust IoT thermostat devices based on a presence, or lack thereof, of particular geofencing subjects, and/or notify a user if a particular geofencing subject has moved outside of an expected location.

In step 902, a cloud-based system (e.g., cloud-bot platform system 102) gathers first raw IoT data (e.g., first raw IoT data 220) associated with a first IoT device (e.g., an IoT motion sensor device 116) associated with a first physical location (e.g., a door and/or doorway). For example, the first raw IoT data may include motion data (e.g., opening/closing of a door). The first raw IoT data may have been detected by one or more sensor engines (e.g., sensor engine 404) of the first IoT device. In some embodiments, a data gathering engine (e.g., data gathering engine 214) gathers the first raw IoT data.

In step 904, cloud-based system (e.g., cloud-bot platform system 102) gathers additional raw IoT data (e.g., additional raw IoT data 220) associated with an additional IoT device (e.g., an IoT camera device 116) associated with a second physical location (e.g., living room). For example, the additional raw IoT data may include image data (e.g., video of the living room). The additional raw IoT data may have been detected by one or more sensor engines (e.g., sensor engine 404) of the additional IoT device. In some embodiments, a data gathering engine (e.g., data gathering engine 214) gathers the additional raw IoT data.

In step 906, the cloud-based system normalizes the first and additional raw IoT data to a normalized data format to create first normalized data and additional normalized data having the same normalized data format. In some embodiments, a data normalization engine (e.g., data normalization engine 216) normalizes the first and additional raw IoT data.

In step 908, the cloud-based system stores the first and additional normalized data. In some embodiments, a management engine (e.g., management engine 202) stores the normalized data in a normalized data datastore (e.g., normalized data datastore 206).

In various embodiments, some or all of the steps 902-908 may be repeated. Accordingly, the cloud-based system may gather, normalize, and store data continuously, periodically, on-demand, in real-time, and/or the like. In some embodiments, the IoT data may be timestamped and/or stored persistently. For example, the most recent IoT data (e.g., as determined by respective timestamps) may be referred to as "current" IoT data, while older IoT data (e.g., as determined by respective timestamps) may be referred to as historical data.

In step 910, a cloud-bot (e.g., a geofencing-enabled cloud-bot 112) triggers an execution of the cloud-bot using the first normalized data as input for the cloud-bot. For example, while in a sleep mode or other non-executing mode, the cloud-bot may listen for an execution trigger (e.g., movement/motion of a door, user instruction, signal from other bot), and upon detection of the execution trigger, the cloud-bot may execute. In some embodiments, a cloud-bot execution engine (e.g., cloud-bot execution engine 304) triggers the execution of the cloud-bot.

In some embodiments, the cloud-bot platform system triggers the execution of the cloud-bot. For example, a cloud-bot deployment engine (e.g., cloud-bot deployment engine 218) may trigger the execution.

In step 912, the cloud-bot determines whether the execution of the cloud-bot is valid. In some embodiments, the cloud-bot may trigger a countdown timer (e.g., 2 seconds) and compare first timestamped normalized data of the first normalized data associated with the start of the countdown timer with second timestamped normalized data of the first normalized associated with the end of the countdown timer. If the first timestamped normalized data indicates first information/state (e.g., door closed) different from a second information/state (e.g., door open) indicated by the second timestamped normalized data, the cloud-bot may determine the execution trigger is valid, and export cloud-bot variables including the information/state (step 914), and terminate the first execution of the cloud-bot (step 916). In some embodiments, a cloud-bot processing engine (e.g., cloud-bot processing engine 306) determines whether the first execution of the cloud-bot is valid.

In step 918, the cloud-bot triggers a subsequent execution of the cloud-bot using the additional normalized data and the exported cloud-bot variables as inputs for the cloud-bot. For example, the subsequent execution of the cloud-bot may be caused by the previous execution of the cloud-bot. In some embodiments, a cloud-bot execution engine (e.g., cloud-bot execution engine 304) triggers the subsequent execution of the cloud-bot.

In some embodiments, the cloud-bot platform system triggers the execution of the subsequent execution of the cloud-bot. For example, the cloud-bot deployment engine may trigger the execution.

In step 916, the cloud-bot evaluates whether a response condition of the cloud-bot is satisfied. For example, if the cloud-bot variables indicate a valid door opening trigger (e.g., indicating someone left the home, and it was not a false-positive detection of door motion), and the additional normalized data indicates that the second physical location is not occupied (e.g., image data for a predetermined time window does not include an image of a person), the response condition may be satisfied (e.g., indicating that the home is empty). Alternatively, if the cloud-bot variables indicate a valid door opening event (e.g., indicating someone left the home, and it was not a false-positive detection of door motion), and the additional normalized data indicates that the second physical location is occupied (e.g., image data including an image of a person), the response condition may not be satisfied (e.g., indicating someone is still in the home). If the response condition is satisfied, the cloud-bot may initiate one or more notification and/or control actions (step 922), export cloud-bot variables (step 924), and terminate the subsequent execution of the cloud-bot (step 926).

For example, if the cloud-bot determines that the home is now empty, the cloud-bot may automatically arm a security system, and/or provide a notification to a user reminding the user to manually arm the security system. In some embodiments, the cloud-bot may have previously queried the user (e.g., "Would you like me to automatically arm your security system when I detect you've gone away?"), and based upon the user response (e.g., "Yes"), the cloud-bot may respond accordingly.

In some embodiments, the cloud-bots described herein are capable of learning, determining and/or being configured to recognize correlations/relationships between multiple sensors of a particular IoT device and/or multiple IoT devices. For example, if a first entry sensor closes and then a first motion sensor detects motion shortly thereafter, there may be a correlation (e.g., a causal relationship) between the two sensors (e.g., they may be in the same vicinity). For example, Bayesian Networks may be used to determined causal relationships. If a second entry sensor closes and then a second motion sensor detects motion activity, there may be a correlation between the second entry sensor and second motion sensor. This may allow, for example, the cloud-bot to refine the predetermined time window based on previous correlated measurements from sensors/devices.

In various embodiments, some or all of the step 918-926 may be repeated for any additional IoT devices. For example, additional IoT devices may be deployed in other physical locations (e.g., bedroom, dining room), which may also be used to evaluate whether the response condition is satisfied.

Figure 10:
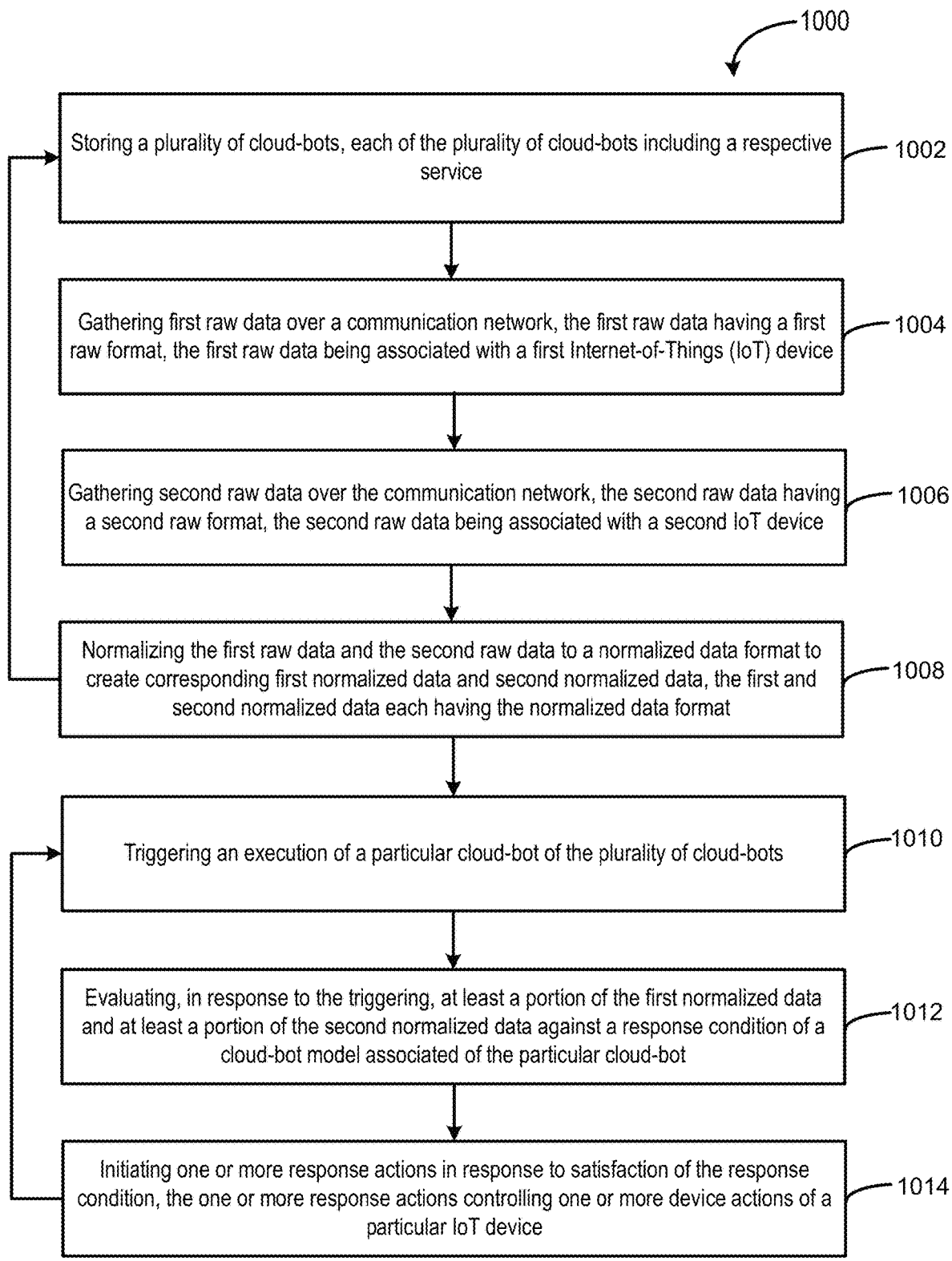
FIG. 10 depicts a flowchart of an example of a method of deployment and operation of a cloud-bot according to some embodiments.

FIG. 10 depicts a flowchart 1000 of an example of a method of deployment and operation of a cloud-bot according to some embodiments.

In step 1002, a cloud-based system (e.g., cloud-bot platform system 102) stores a plurality of cloud-bots (e.g., cloud-bots 112). Some or all of the plurality of cloud-bots may include a respective service. In some embodiments, a management engine (e.g., management engine 202) stores the cloud-bots in a datastore (e.g., cloud-bot datastore 210).

In step 1004, the cloud-based system gathers first raw IoT data (e.g., a first set of raw IoT data 220) over a communication network (e.g., communication network 108). The first raw IoT data may have a first raw format (e.g., a Nest-specified data format). The first raw IoT data may be associated with a first Internet-of-Things (IoT) device (e.g., a Nest IoT thermostat device). In some embodiments, a data gathering engine (e.g., data gathering engine 214) gathers the first raw IoT data.

In step 1006, the cloud-based system gathers second raw IoT data (e.g., a second set of raw IoT data 220) over the communication network. The second raw IoT data may have a second raw format (e.g., a Honeywell-specified data format). The second raw IoT data may be associated with a second IoT device (e.g., a Honeywell IoT humidity device). In some embodiments, the data gathering engine gathers the second raw IoT data.

In step 1008, the cloud-based system normalizes the first raw IoT data and the second raw IoT data to a normalized data format to create corresponding first normalized data and second normalized data. The first and second normalized data may each having the normalized data format. In some embodiments, a data normalization engine (e.g., data normalization engine 216) normalizes the first and second raw IoT data.

In step 1010, a particular cloud-bot of the plurality of cloud-bots triggers an execution of the particular cloud-bot. In some embodiments, a cloud-bot execution engine (e.g., cloud-bot execution engine 304) triggers the execution of the particular cloud-bot. In other embodiments, the cloud-based system triggers the particular cloud-bot. For example, the cloud-bot deployment engine 218 may trigger the execution of the particular cloud-bot in response to one or more execution triggers, described elsewhere herein.

In some embodiments, the cloud-based system triggers execution of the particular cloud-bot. For example, a deployment engine (e.g., cloud-bot deployment engine 218)

In step 1012, the particular cloud-bot evaluates at least a portion of the first normalized data and at least a portion of the second normalized data against a response condition of a cloud-bot model of the particular cloud-bot. In some embodiments, a cloud-bot model receives the at least a portion of the first normalized data as a first input and the at least a portion of the second normalized data as a second input. The cloud-bot model may identify a relationship between the first input and the second input, which may cause a satisfaction of the response condition. In some embodiments, a cloud-bot processing engine (e.g., cloud-bot processing engine 306) performs the evaluation.

In step 1014, the particular cloud-bot initiates one or more response actions in response to satisfaction of the response condition, the one or more response actions controlling one or more device actions of a particular IoT device. The particular IoT device may be the first IoT device, the second IoT device, or another IoT device. In some embodiments, the cloud-bot processing engine initiates the one or more response actions.

In step 1016, the particular cloud-bot terminates execution of the cloud-bot (e.g., transitions to sleep mode). In some embodiments, the cloud-bot execution engine and/or cloud-bot processing engine terminates execution of the cloud-bot.

Figure 11:
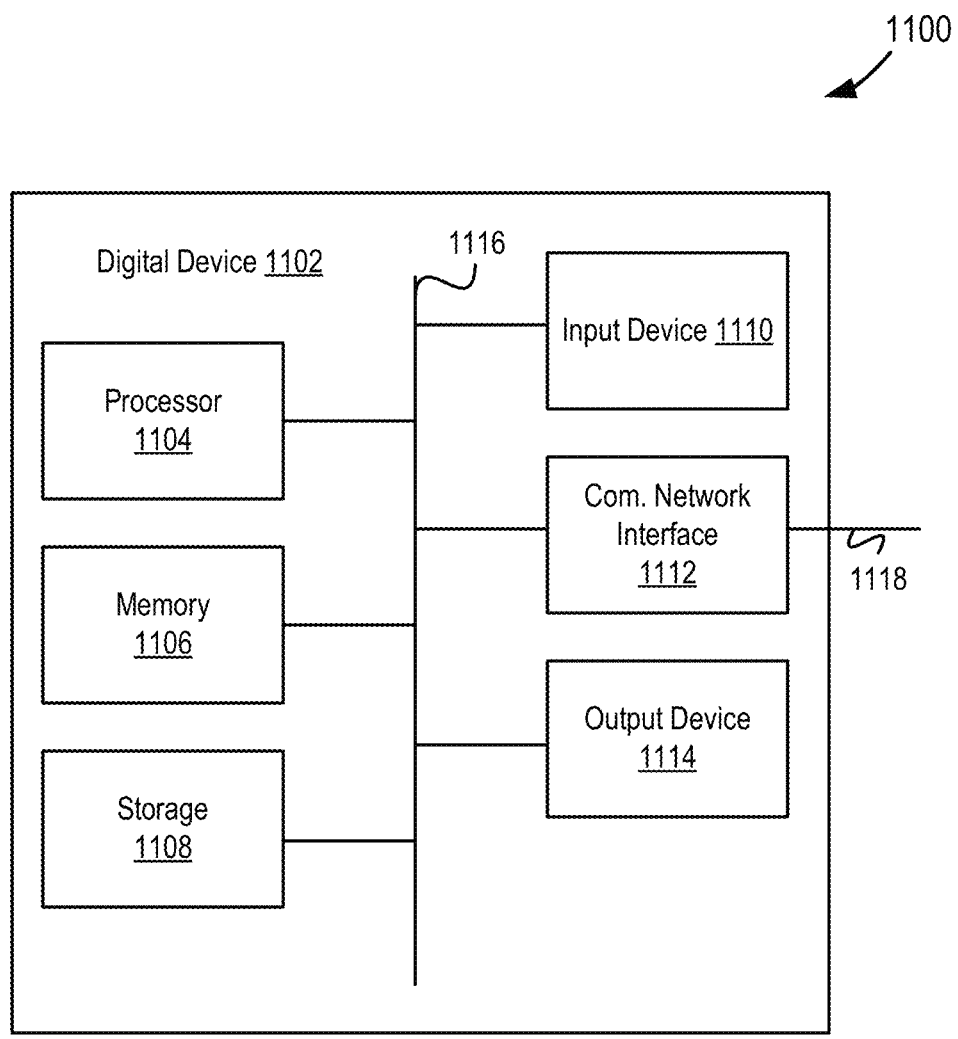
FIG. 11 is a diagram of an example computer system for implementing the features disclosed herein.

FIG. 11 depicts a diagram 1100 of an example of a computing device 1102. Any of the cloud-bot platform systems 102, the user network systems 104, the IoT back-end systems, and the communication network 108 may comprise an instance of one or more computing devices 1102. The computing device 1102 comprises a processor 1104, memory 1106, storage 1108, an input device 1110, a communication network interface 1112, and an output device 1114 communicatively coupled to a communication channel 1116. The processor 1104 is configured to execute executable instructions (e.g., programs). In some embodiments, the processor 1104 comprises circuitry or any processor capable of processing the executable instructions.

The memory 1106 stores data. Some examples of memory 1106 include storage devices, such as RAM, ROM, RAM cache, virtual memory, etc. In various embodiments, working data is stored within the memory 1106. The data within the memory 1106 may be cleared or ultimately transferred to the storage 1108.

The storage 1108 includes any storage configured to retrieve and store data. Some examples of the storage 1108 include flash drives, hard drives, optical drives, cloud storage, and/or magnetic tape. Each of the memory system 1106 and the storage system 1108 comprises a computer-readable medium, which stores instructions or programs executable by processor 1104.

The input device 1110 is any device that inputs data (e.g., mouse and keyboard). The output device 1114 outputs data (e.g., a speaker or display). It will be appreciated that the storage 1108, input device 1110, and output device 1114 may be optional. For example, the routers/switchers may comprise the processor 1104 and memory 1106 as well as a device to receive and output data (e.g., the communication network interface 1112 and/or the output device 1114).

The communication network interface 1112 may be coupled to a network (e.g., network 108) via the link 1118. The communication network interface 1112 may support communication over an Ethernet connection, a serial connection, a parallel connection, and/or an ATA connection.

The communication network interface 1112 may also support wireless communication (e.g., 802.11a/b/g/n, WiMax, LTE, WiFi). It will be apparent that the communication network interface 1112 may support many wired and wireless standards.

It will be appreciated that the hardware elements of the computing device 1102 are not limited to those depicted in FIG. 11. A computing device 1102 may comprise more or less hardware, software and/or firmware components than those depicted (e.g., drivers, operating systems, touch screens, biometric analyzers, and/or the like). Further, hardware elements may share functionality and still be within various embodiments described herein. In one example, encoding and/or decoding may be performed by the processor 1104 and/or a co-processor located on a GPU (i.e., NVidia).

Figure 12:
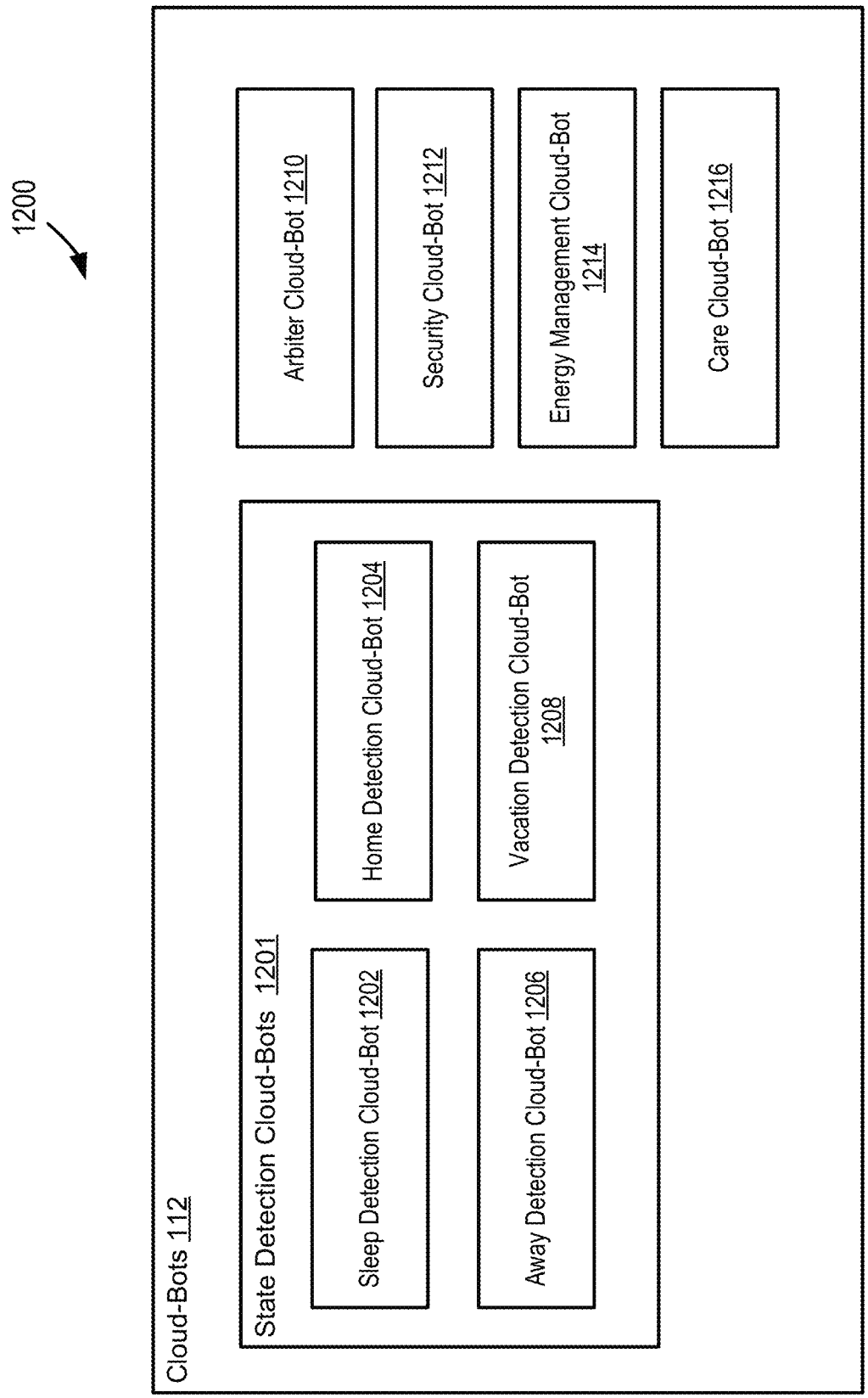
FIG. 12 depicts a diagram of example cloud-bots according to some embodiments.

FIG. 12 depicts a diagram 1200 of example cloud-bots 112 according to some embodiments. In the example of FIG. 12, the cloud-bots 112 include state detection cloud-bots 1201, an arbiter cloud-bot 1210, a security cloud-bot 1212, an energy management cloud-bot 1214, and a care cloud-bot 1216. The state detection cloud-bots 1201 include a sleep detection could-bot 1202, a home detection cloud-bot 1204, an away detection cloud-bot 1206, and a vacation detection cloud-bot 1208. In some embodiments, each of the cloud-bots 1202-1216 may be configured as shown in FIG. 3.

In some embodiments, the state detection cloud-bots 1201 may cooperate with one or more sensors distributed throughout a region (e.g., a home) to determine a likelihood the region is in a particular state (e.g., a home state, away state, sleep state, vacation state). The sensors may be wireless sensors and/or components of an IoT device. These sensors may include, among other types, activity/motion sensors which may detect occupancy movement, entry sensors to detect doors opening/closing, energy consumption sensors, and/or lighting sensors. A set of machine learning algorithms (or, models), which may be an application layer of a cloud-bot 112 and/or cloud-bot platform system 102, may enable real-time processing of live and/or historical data, and may interpret patterns across multiple sources of sensor data to predict a likelihood of a particular state.

In one example, a state detection cloud-bot 1201 may cooperate with an entry sensor deployed proximate to an outer door of a house (e.g., a "front" door, a "back" door, a "side" door, and/or the like) and a motion sensor deployed within the house. The entry sensor may detect whether a door has been opened and/or closed, and the motion sensor may detect activity (e.g., motion) within the house (e.g., within the living room and/or bedroom). The state detection cloud-bot 1201 may also cooperate with one or more IoT devices (e.g., IoT devices 116). For example, a state detection cloud-bot 1201 may determine that a house has a particular likelihood of being in a particular state based on a time of day and/or day of the week that the sensors are triggered, how often the sensors are triggered (e.g., within a period of time), how much motion is detected (e.g., within a period of time), and/or the like.

In some embodiments, the state detection cloud-bots 1201 may control and/or instruct one or more other cloud-bots 112 and/or IoT devices 116 based on a particular state and/or likelihood of the particular state. For example, in some embodiments, the state detection cloud-bots 1201 include one or more models. The models may comprise machine learning models. The machine learning models may be random forest models (e.g., random forest regression models). Sensor data may comprise real-time input(s) for the models, and the likelihood a region is in a particular state may comprise outputs of the models.

In some embodiments, the state detection cloud-bots 1201 may utilize one or more thresholds (e.g., machine learning thresholds). For example, a state detection cloud-bot 1201 may generate a likelihood that a region is in a particular state (e.g., a home state). If the state detection cloud-bot 1201 determines the likelihood satisfies a threshold condition (e.g., between 50% and 70% likelihood) associated with the particular state, the state detection cloud-bot 1201 may initiate one or more response actions (e.g., turn the temperature down 2 degrees). The response actions may control one or more device actions, such as device actions of an IoT device. For example, the response actions may instruct another cloud-bot (e.g., an energy management cloud-bot 1214) to reduce thermostat temperature by 2 degrees.

In some embodiments, if the likelihood satisfies another threshold condition (e.g., between 70% and 100% likelihood) associated with the particular state, the state detection cloud-bot 1201 may initiate one or more other response actions (e.g., turn the temperature down 4 degrees). For example, the second response action may instruct another cloud-bot (e.g., energy management cloud-bot 1214) to reduce thermostat temperature 4 degrees, and/or instruct another cloud-bot (e.g., security cloud-bot 1212) to lock one or more doors.

In some embodiments, the state detection cloud-bots 1201 may function to detect and/or control transition states. A transition state may be an intermediary state between two other states. For example, transition states may include a transition from a home state to an away state; a transition from an away state to a home state; a transition from a sleep state to a home state; and/or a transition from an away state to a vacation state, a transition from a vacation state to a home state. A transition state may be detected based on a previously detected state and/or a likelihood of a current a state. For example, the most recent detected state may be a home state, but a current prediction may indicate a likelihood of a sleep state. If the likelihood satisfies a primary threshold condition (e.g., greater than 90%), the state may switch directly from the home state to a sleep state. Alternatively, if the likelihood does not satisfy the primary threshold condition, but satisfies a secondary threshold condition (e.g., between 30% and 50%, between 50% and 70%, between 70% and 90%) the state may be set to a transition state that is between a home state and a sleep state.

In some embodiments, the transition may progress at a predetermined rate and/or variable rate, unless interrupted. For example, the transition may last two hours (e.g., predetermined) regardless of the likelihood of the other state, or it may be a shorter transition (e.g., 1.5 hours) if the likelihood of the other state is at a higher portion of the secondary threshold condition. Similarly, it may be a longer transition (e.g., 2.5 hours) if the likelihood of the other state is at a lower portion of the secondary threshold condition. Regardless of the transition rate, an interruption may cause the transition to be changed (e.g., modified and/or canceled), and either revert back to the previous state and/or set to another state. The change may be treated as a transition. Accordingly, the change may be direct or gradual. For example, if the state is currently transitioning from a home state to a sleep state and motion is detected, it may transition back to the home state. Interrupts may be automatically detected (e.g., based on motion sensors) and/or manual input. For example, a user may feel the temperature decreasing (e.g., in accordance with a transition to a sleep state), and manually instruct the system that the state should be home, and/or that the user is otherwise not sleeping. It will be appreciated that these rules may apply to some or all of the different states and/or state detection cloud-bots 1201 described herein.

In some embodiments, interrupts may be used to facilitate reinforcement of machine learning algorithms (or, models) and/or thresholds. Accordingly, interrupts may cause one more thresholds to be automatically and/or dynamically adjusted. For example, if a state detection cloud-bot 1201 is configured to perform particular response actions (e.g., turn down temperature, locks doors) at a particular likelihood threshold (e.g., 70%), and if an interrupt is detected, and/or if interrupts are detected above a threshold rate (e.g., 33% of the last 10 likelihood determinations), the particular threshold may adjusted up (e.g., up to 80% from 70%). Similarly, if no interrupts are detected, and/or if interrupts are detected below a threshold rate (e.g., 10% of the last 10 likelihood determinations), the particular threshold may be adjusted down (e.g., down to 60% from 70%).

In some embodiments, transition state thresholds, as well as some or all of the other thresholds discussed herein, may be dynamic. For example, a first transition state (e.g., a home state) may be transitioning to a second transition state (e.g., an away state) based on a particular likelihood (e.g., 50%) of being in the second state. The transition state for that particular likelihood may set a default transition period (e.g., 2 hours) and/or default control actions (e.g., turn temperate down 1 degree every 30 minutes). The default transition period and/or default control actions may be based on a threshold range that triggered the transition (e.g., a threshold range of 50-70% likelihood of being in the second state). However, transitions periods and/or transition control actions may be adjusted. For example, reinforcement, as discussed elsewhere herein, may cause transition periods and/or control actions to be adjusted.

In some embodiments, state detection cloud-bots 1201 may use transition state information to determine a likelihood of a state. For example, a state detection cloud-bot 1201 may calculate that a region has a 50% likelihood of being in an away state, which may trigger a transition to an away state. In some embodiments, likelihood of state may be calculated at various times, rates and/or frequencies. For example, a new likelihood may be calculated while a region is already in a transition state, and the transition state information for that transition may be used when performing a new calculation. For example, a 50% likelihood of being in an away state may have triggered a first "stage" transition that has a relatively long transition period (e.g., 2 hours) and/or less intrusive control actions (e.g., lower temperate 1 degree every 30 minutes). However, the new calculation may use transition state information to calculate that the likelihood of being in an away state is 70%, which may trigger a second "stage" transition. The second stage transition may have a shorter period than the first stage transition and/or may have more intrusive control actions (e.g., lower temperature 2 degrees every 10 minutes). Some embodiments may have additional stages.

In some embodiments, transition state information may include the type of transition (e.g., from home to away, from home to sleep, and/or the like), a "stage" of the transition, whether any interrupts were detected, how many interrupts were detected, the type of detected interrupt(s) (e.g., manual or automatic, entry sensor or motion sensor) and/or how long the region has been in that transition state. Transition state information may also include historical transition state information, such as the information used for reinforcement. Transition state information may be used to trigger a new calculation for likelihood a region is in a particular state. For example, if a transition state has not received any interrupts within the last 30 minutes, that information may be used to trigger a new likelihood calculation, and that transition state information may be used in the new calculation.

In some embodiments, thresholds may be different for different user's and/or regions. For example, a particular state detection cloud-bot 1201 may have the same initial threshold conditions when it is initially deployed. However, these may be adjusted based on interrupts, as discussed above. In some embodiments, the initial (or, default) threshold conditions may be selected from a set of available default threshold conditions. For example, the default threshold conditions may be based on other similar homes (e.g., similar home size, number of occupants, and/or the like) that have models that have already been trained with a threshold amount of data and/or over a predetermined amount of time (e.g., 6 months). This may, for example, result in more accurate initial deployments.

In some embodiments, the state detection cloud-bot 1201 may set and/or assign states for one or more regions. For example, if the likelihood of a particular state satisfies a particular state threshold condition (e.g., between 70% and 100%), then the state detection cloud-bot 1201 may the set the state for the associated region(s). For example, region states may be maintained in a table and/or other structure stored in a datastore (e.g., a datastore of the cloud-bot platform system 102). This may allow, for example, other cloud-bots 112 to access region states in order to determine which control actions to perform, instead of only relying on instructions from the state detection cloud-bots 1201.

In some embodiments, when cloud-bots 112 (e.g., state detection cloud-bots 1201) receive communications that the state has changed or is expected to change, and/or when cloud-bots 112 otherwise determine a change of state (e.g., by checking a table maintaining states), the cloud-bots 112 can react accordingly. For example, the cloud-bots 112 controlling lighting services can perform the following types of services:

Induce the circadian rhythm. Brighter and energizing lights at night while the user should be fully awake, warmer and darker lighting while the user will be getting ready for bed. Bring the lights up during the user's normal wake-up routine.

Prevent falls during nightly bathroom visits. If we predict the user should be fully asleep right now, but then see activity that indicates the person is out of bed, bring up the lights gently to help the user find the bathroom.

In another example, the cloud-bots 112 controlling thermostat services can perform the following types of services:

Save energy at night. Turn down the heater or air conditioning in a direction that saves energy when we know the user will be asleep.

Induce sleep. People generally sleep better when it is colder. Enable a cold-temperature environment and then back off later if we need to save energy.

Pre-heat or Pre-cool the home in the morning. Before we predict the user will be fully awake, pre-heat or pre-cool the home so they are comfortable.

Recommend opening or closing windows. If the weather is really nice outside and conducive to sleep, send a notification to the user recommending or asking if they'd like to open the windows before bed. Turn down the heater or air conditioning to save energy.

In another example, the cloud-bots 112 controlling large load controllers and/or smart plugs can perform the following types of services:

Pre-heat the bathroom floors. If it is cold outside and the user has heated flooring, heat the floors well in advance of the user waking up and then turn off after they've hit their peak morning activity.

Make coffee. When the user is predicted to be waking up, turn on the coffee or hot water kettle using a smart plug or connected coffee maker.

Save energy on the hot water heater. Turn down the hot water heater at night, and have hot water ready to go in the morning when the user wakes up.

In another example, the cloud-bots 112 controlling security and/or safety services can perform the following types of tasks:

Automatically arm the security system at night.

Make sure the doors are locked and lock them automatically if they're not.

For families caring for patients with dementia (PWD), identify the PWD wandering around the home at night or falling down. Sound alarms if a door opens at night which might indicate the PWD is wandering off.

The sleep detection cloud-bot 1202 may function to determine a likelihood that some or all occupants of a region are asleep. In some embodiments, the sleep detection cloud-bot 1202 may automatically detect patterns that identify and/or track occupant sleep via sensor data gathered from sensors deployed in the region, as discussed elsewhere herein.

Generally, sleep detection is a fundamental component of smart home services. By knowing whether some or all occupants are sleeping, the system can enable services around energy management (e.g., energy management cloud-bot 1214), caring for others, such as seniors, children and/or people suffering some affliction (e.g., care cloud-bot 1216), safety, and/or security (e.g., security cloud-bot 1212). At the same time, it may be impossible, or at least not advisable, to rely upon a person to manually instruct a smart home system that they are sleeping, because people forget to do so and by the time they are asleep, they cannot declare themselves to be asleep. Instrumenting beds with sensors is usually considered invasive, and it adds cost to an overall smart home system. The sleep detection cloud-bot 1202 may identify people that are sleeping by using ambient activity sensors in their region that they do not need to manually instruct. The activity sensors that may be used for sleep detection, and/or other states, include, but are not limited to, motion detectors, smart bulbs and switches, and/or energy metering devices.

Figure 15:
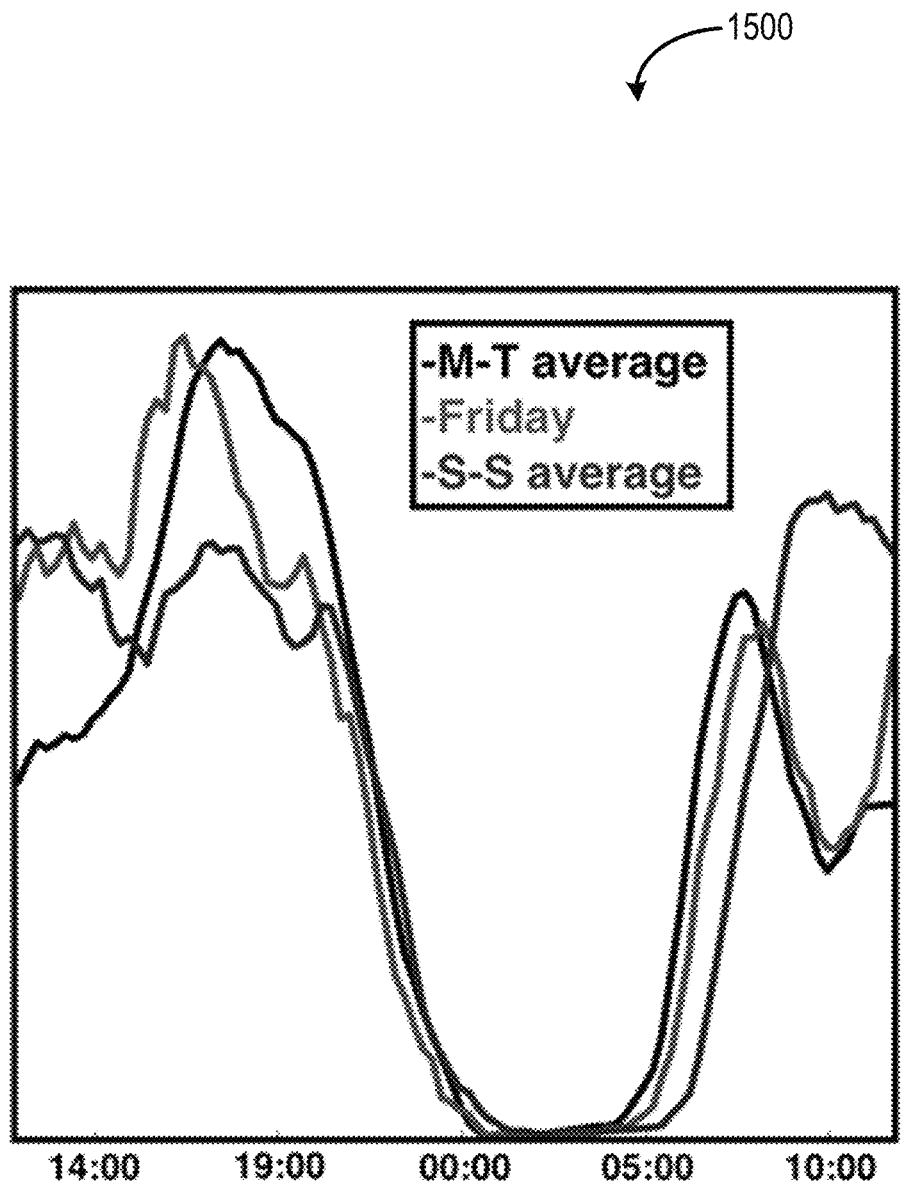
FIG. 15 depicts a diagram of an example motion sensor activity histogram according to some embodiments.

In some embodiments, the sleep detection cloud-bot 1202 may survey the sleep patterns of one or more occupants (or, users) in a region. For example, motion sensor data may be collected (e.g., by cloud-bot platform system 102) over time and stored in a database for later retrieval. Motion sensor activity may be aggregated together and transformed into a histogram of activity by adding up the total positive motion detects that occurred within each 5 minute to 15 minute period. In the graph shown in FIG. 15, midnight is represented in the center at 00:00. The portion of the graph to the left of 00:00 is evening, and the portion of the graph to the right of 00:00 is morning. The black line represents average motion sensor activity from Monday through Thursday, the red line represents average motion sensor activity from Friday, and the blue line represents average motion sensor activity from the weekends. As shown, each day is accentuated by a spike of activity in the evening before bed, and a spike of activity in the upon wakeup in the morning. For an average weekday schedule, the circadian rhythm tends to be dictated more by a person's profession, and on weekends a family's natural circadian rhythms tend to dominate by going to be later and sleeping in longer.

In some embodiments, to make the machine learning algorithms more accurate, the sleep detection cloud-bot 1202 may employ two methods: an unsupervised algorithm (e.g., principal component analysis, or "PCA") which groups together regions with similar observed patterns, and a historical data decaying method which linearly desensitizes the algorithms to older historical datasets. This may be applied to other state detection cloud-bots 1201, as well. Similarly, in some embodiments, some or all of features of the sleep detection cloud-bot 1202 may be included in one or more of the other state detection cloud-bots 1201.

Figure 16:
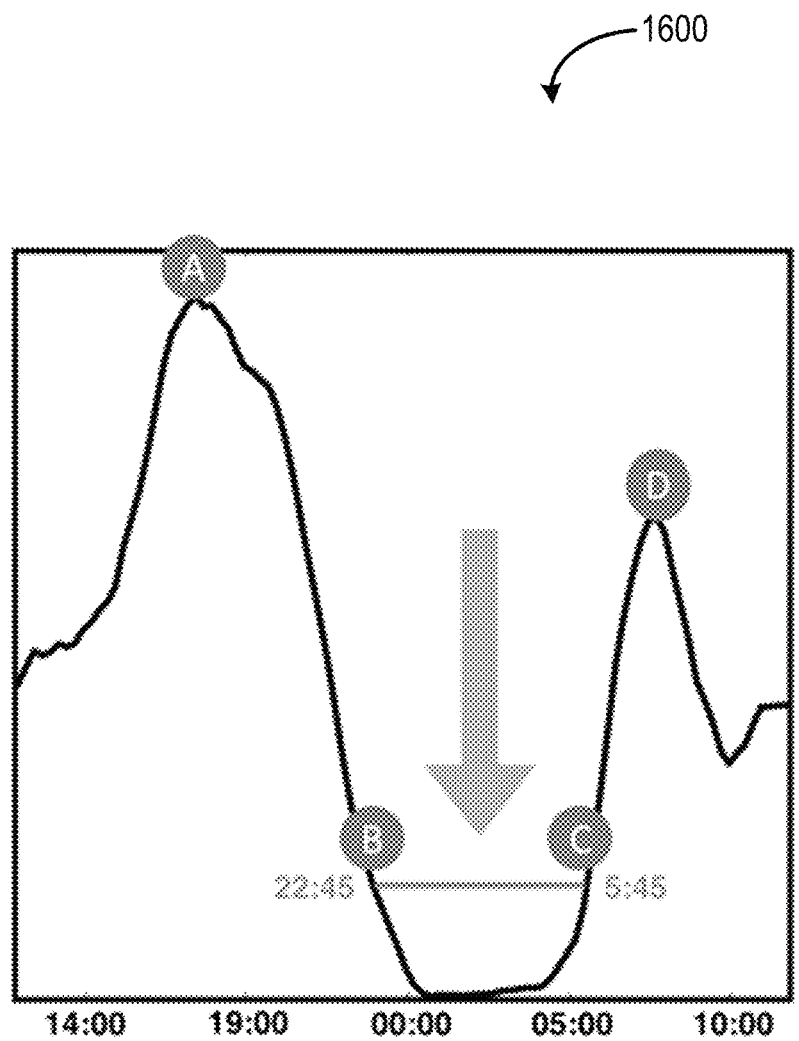
FIG. 16 depicts a diagram of example features detected within a motion sensor activity histogram according to some embodiments.

As shown in FIG. 16, the machine learning algorithm identifies several features in the historical motion activity histogram, including: (A) the peak activity at night, (B) the point at which we predict the family is asleep, (C) the point at which we predict the family is awake, and (D) the peak activity in the morning. The defined duration the family sleeps is somewhat elastic and/or variable. An estimate of 7-8 hours is used initially, and may be refined based on actual observed activity. The cloud-bots may also query the use (e.g., via in-app questions on mobile devices or over SMS) how long they usually sleep. This may, for example, be used to search for sleep activity, and can also be used as a feedback mechanism for users to compare actual observed sleep versus their sleep goals.

In some embodiments, the algorithms and/or models described herein may be executed within a cloud-bot's microservice against the user's real-time and historical data. Upon initialization, historical data may be downloaded from each relevant device and transformed into histograms of activity for each day of the week and weighted based on the age of the data. This information may be injected into the algorithms and/or models which may identify the key point activities for each day of the week. The output of the machine learning algorithms may be a model of "activity maps" which may identify each day of the week and the times of each day for the user's peak evening activity, the predicted sleep time relative to the peak evening activity, the predicted waking time, and/or the predicted morning activity. In the two-dimensional array below, each day of the week separated by spaces and start with Monday on the left, and the times of each day for key activities. The following example may be a model for a user's sleep patterns.

```
activity_map =
[
[ 19.25 20.75 19. 18. 20.5 20.5 19.5 ] # Peak Activity
[ 23. 22.75 23.5 23.75 23.5 22.75 23.5 ] # Asleep
[ 7.25 7. 7.25 7.5 7.5 7.25 7. ] # Just waking up
[ 8.75 9. 8.75 9.25 9.25 8.5 11.75] # Morning peak of activity
]
Data layout (hour into the day):
[ Monday Tuesday Wednesday Thursday Friday Saturday Sunday ]
```

After producing these predicted times based on predetermined amount of historical activity (e.g., at least one week of historical activity), the sleep detection cloud-bot 1202 may apply a real-time search during the current day to find today's peak evening activity. To do this, the cloud-bot 1202 may look up the day of the week and the time of day for peak evening activity in the activity map produced by the machine learning algorithms. For example, in the data above, it is declared that the peak evening activity on Monday evenings is expected to occur around 19.25 hours into the day based on historical activities (07:15 PM). The cloud-bot may set a timer to begin searching for the peak approximately 30-60 minutes ahead of the expected peak activity. As activity sensors trigger, the cloud-bot wakes up and logs this activity. These data points can come from motion detectors and user interactions with devices such as lights, smart plugs, energy meters, thermostats, and more. In some embodiments, every five to fifteen minutes, the sleep detection cloud-bot 1202 may summarize the positive data points that indicate activity in the home. The peak may be identified when the number of activity events accumulated during a finite duration of time (e.g., 5, 10, or 15 minute intervals) begins to decrease (e.g., like the histograms in our historical data machine learning analysis). Once the activity begins to decrease, the peak activity for the day has been identified.

In some embodiments, after the current day's peak activity is identified, the sleep detection cloud-bot 1202 may set timers to find the point at which the user is asleep. The sleep detection cloud-bot 1202 may use the activity map machine learning models to predict how long it will take this user to actually go to sleep (e.g., no activity in the home) relative to the peak activity. In the model presented above, on Monday the peak activity is expected to be at 07:15 PM (e.g., 19.25 hours into Monday) and the sleep time is expected to be 11:00 PM (e.g., 23 hours into Monday). If the current day's real-time analysis finds the peak activity at 7:30 PM (e.g., 15 minutes later than usual), sleep detection cloud-bot 1202 may predict the user will be in bed by approximately 11:15 PM (e.g., 15 minutes later than usual on Mondays). If sleep detection cloud-bot 1202 continues to see significant activity in the home by the time the sleep detection cloud-bot 1202 predicted the user would be asleep, then sleep detection cloud-bot 1202 may delay further until it sees no more activity that could be interpreted as a human being awake in the home.

In some embodiments, the sleep detection cloud-bot 1202 uses machine learning models to predict the time the user will wake up the next day. On days where the family has to go to work or to school, this time is very consistent and predictable. On days where the family does not have to go to work or school, this time can be very inconsistent. By searching for accumulated activity in 5, 10, or 15 minute intervals against the time-of-day predicted by our machine learning models, we are able to identify if the family wakes up a bit earlier than usual. Otherwise, even in the absence of additional activity data points (because people generally do not instrument their bedrooms with sensors), we make a prediction that the family is waking up based on the machine learning models and how long we predict the family will sleep based on historical data. The "wake-up" time in our machine learning models is predicted by the peak morning activity identified from historical data later in the day, and the general amount of time the family is expected to sleep.

In some embodiments, the sleep detection cloud-bot 1202 identifies four key activities around sleep each day (e.g., peak evening activity, asleep, wake-up, peak morning activity) to facilitate delivery of services around these activities to perform energy efficiency (e.g., energy management cloud-bot 1214), caregiving (e.g., care cloud-bot 1216), and safety and security (e.g., security cloud-bot 1212). The sleep detection cloud-bot 1202 may declare to other cloud-bots when it has identified these activities. For example, a "data stream message" (address+key/value pairs of data) may be communicated and delivered from the sleep detection cloud-bot 1202 to other cloud-bots 112 (e.g., cloud-bots 112 that are listening for sleep patterns. The other cloud-bot 112 (e.g., in an event-driven fashion) may react to this information. Phrases may be used to identify the user's, and/or regions, expected state between cloud-bots 112 that are listening. For example, "H2S" may indicate home-to-sleep state (e.g., an uncertain state where the state detection cloud-bot(s) 1201 predict the user is between their peak evening activity and asleep), "SLEEP" state (e.g., a certain state where the state detection cloud-bot(s) 1201 predict the user is asleep), "S2H" for sleep-to-home state (e.g., an uncertain state where the state detection cloud-bot(s) 1201 predict the user is waking up, between "wake-up" and peak morning activity events), and "HOME" or "STAY" states (e.g., certain states where the state detection cloud-bot(s) 1201 predict the user is awake but still at home). As discussed elsewhere herein, features of the sleep detection cloud-bot 1202 may also be included in other cloud-bots 112.

In some embodiments, in addition to controlling the environment, the sleep detection cloud-bot 1202 can provide feedback to the user about their sleeping habits and whether they met their sleep goals each night (e.g., a sleep score). If this person is being cared for by others, the caregivers may receive a report from the sleep detection cloud-bot 1202 and/or associated cloud-bot (e.g., a care cloud-bot 1216) declaring how well the user slept at night.

The home detection cloud-bot 1204 may function to determine whether one or more regions should be set, and/or otherwise be associated with, a home state. A region may include a one or more buildings (e.g., house, apartment), rooms within a building, and/or other region. A user-network system 104 may define a region. In some embodiments, a region may include one or more sub-regions. For example, a region may be a house, and the sub-regions may include rooms of the house. For sake of illustrative clarity, a "region" may refer to one or more regions and/or sub-regions. In some embodiments, a home state may indicate that at least one occupant is within a region. An occupant may be limited to human occupants, although it may also include other types of occupants (e.g., pets). In some embodiments, if the home detection cloud-bot 1204 has detected motion sensor data within a predetermined amount of time (e.g., within one hour), the home detection cloud-bot 1204 may determine the region is in a home state.

The away detection cloud-bot 1206 may function to determine a likelihood a region is in an away state. In some embodiments, the away detection cloud-bot 1206 may determine the likelihood based on entry sensor data and/or motion sensor data. For example, if an entry sensor has detected that an outer door has been closed for a threshold amount of time (e.g., 15 minutes) and there has not been any motion detected within the region for that threshold amount of time, the away detection cloud-bot 1206 may determine with a relatively high likelihood (e.g., 90%) that the region is in an away state.

In some embodiments, the away detection cloud-bot 1206 may predict when to transition from an away state to a home state (e.g., when a user will return home). Prediction for transition from an away state to a home state may use a different model than is used for determining away state. For example, the away detection cloud-bot 1206 may predict a user will return in 2 hours (e.g., based on time of day, day of week, sensor data, and/or other data described herein), and the away detection cloud-bot 1206 may begin transitioning to the home state prior to the user returning home (e.g., 30 minutes before the predicted return).

The vacation detection cloud-bot 1208 may function to determine a likelihood a region is in a vacation state. The vacation detection cloud-bot 1208 may determine a likelihood based on an amount of time the region has been in an away state. For example, the vacation detection cloud-bot 1208 may determine (e.g., a 100% likelihood) that the region is in a vacation state if the region has been in an away state for a threshold amount of time (e.g., at least one week).

The arbiter cloud-bot 1210 may function to resolve conflicts between state detection cloud-bots 1201. Since state detection cloud-bots 1201 execute independent of each other, there may be conflicting outputs from the state detection cloud-bot 1201. For example, an away detection cloud-bot 1206 may indicate a 50% likelihood a region is in an away state, while a sleep detection cloud-bot 1202 may indicate a 70% likelihood a region is in a sleep state. The arbiter cloud-bot 1210 may resolve any number of such conflicts to select the appropriate state detection cloud-bot for controlling the region.

In some embodiments, the arbiter cloud-bot 1210 may compare the respective generated likelihoods of any number of state detection cloud-bots 1201, and select the state detection cloud-bot 1201 with the highest determined likelihood. For example, if the output of the away detection cloud-bot is a 50% likelihood the region is in an away state, and the output of the sleep detection cloud-bot is a 70% likelihood the region is in a sleep state, the arbiter cloud-bot 1201 may determine the region is in the sleep state.

In some embodiments, the arbiter cloud-bot 1210 may select a particular state detection cloud-bot 1201 based on a predetermined prioritization of one or more states, and/or state detection cloud-bots 1201, over one or more other states, and/or state detection cloud-bots 1201, instead of, or in addition to, comparing outputs of state detection cloud-bots 1201. For example, an away state may be prioritized over a sleep state. Accordingly, for example, an away state likelihood of 50% may cause an away state detection cloud-bot 1206 to be selected over a sleep state likelihood of 70% generated by a sleep detection cloud-bot 1202. In some embodiments, the prioritization may be limited by a threshold. For example, the prioritized state may be selected unless the difference between the respective outputs is greater than 40%. Accordingly, for example, although an away state may be prioritized, if the likelihood of the away state is 50% and the likelihood of a sleep state is 95%, the prioritization may be overruled, and the sleep detection cloud-bot 1202 may be selected.

Figure 13:
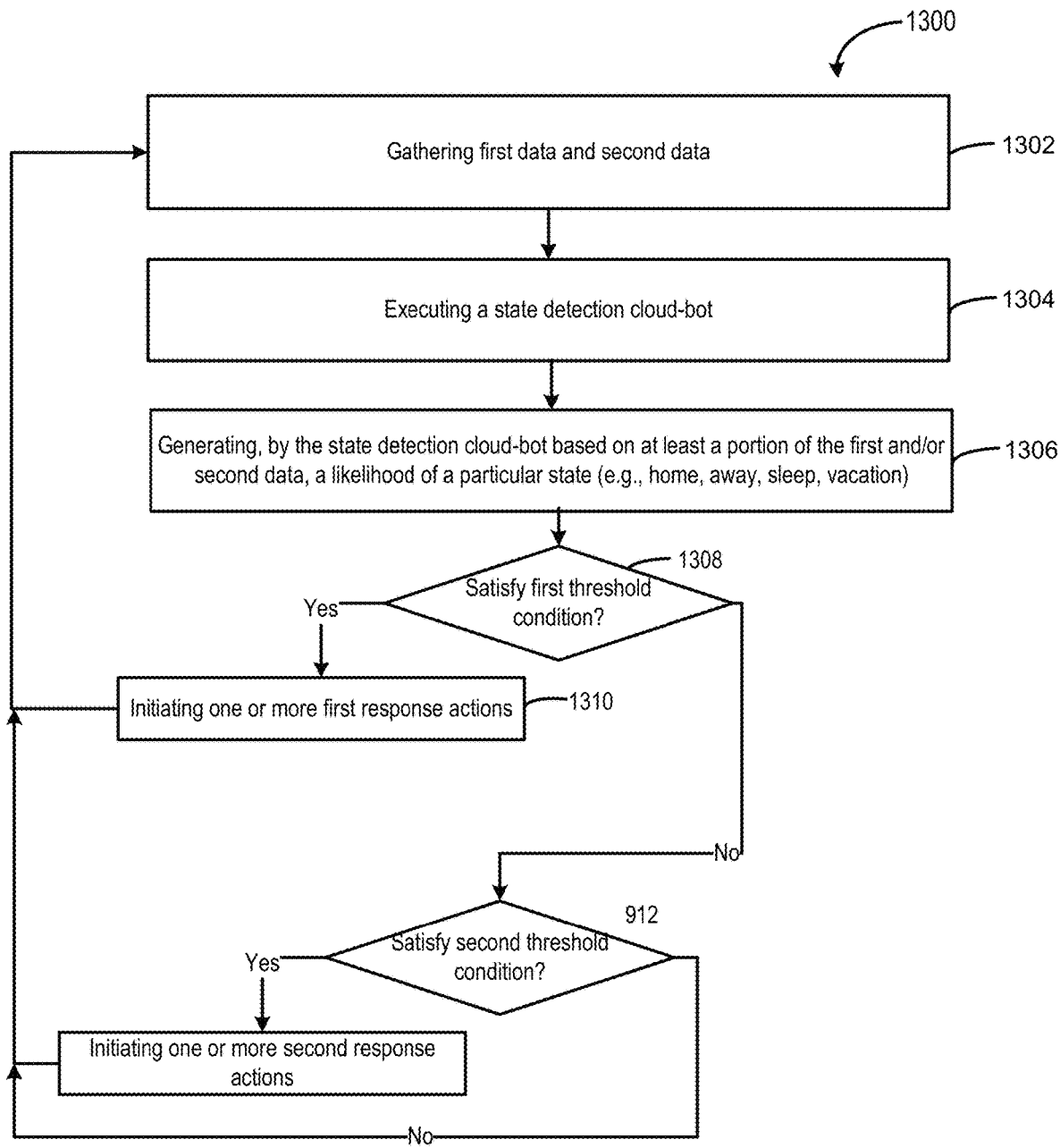
FIG. 13 depicts a flowchart of an example of a method of deployment and operation of a state detection cloud-bot according to some embodiments.

FIG. 13 depicts a flowchart 1300 of an example of a method of deployment and operation of a state detection cloud-bot (e.g., a sleep detection cloud-bot 1202, a home detection cloud-bot 1204, an away detection cloud-bot 1206, a vacation detection cloud-bot 1208) according to some embodiments.

In step 1302, a cloud-based system (e.g., cloud-bot platform system 102) gathers first data and second data over a communication network (e.g., communications network 108). The first data may detected by a first sensor device deployed in a first sub-region (an entryway) of a region (e.g., a house), and the second data may be detected by a second sensor device deployed in a second sub-region (e.g., a living room) of the region. The first and/or second data may be different sets of IoT data (e.g., raw IoT data 220) and/or other data (e.g., detected by sensor(s) of non-IoT devices, such as wireless entry sensors and/or motion sensors). Accordingly, the first and/or second sensor device may be IoT devices (e.g., IoT devices 116) and/or non-IoT devices. For example a non-IoT device may comprise a sensor on a door that detects whether a door has been opened and/or closed. Such a sensor may communicate data locally to another device (e.g., a gateway device and/or IoT device) which may have additionally network connectivity (e.g., Internet connectivity to the communications network 108). In some embodiments, a data gathering engine (e.g., data gathering engine 214) gathers the data.

In step 1304, the cloud-based system executes a state detection cloud-bot. For example, the state detection cloud-bot may be a home detection cloud-bot (e.g., home detection cloud-bot 1204), an away detection cloud-bot (e.g., away detection cloud-bot 1206), a vacation detection cloud-bot (e.g., vacation detection cloud-bot 1208), and/or a sleep detection cloud-bot (e.g., sleep detection cloud-bot 1202). In some embodiments, a deployment engine (e.g., cloud-bot deployment engine 218) executes the state detection cloud-bot.

In step 1306, the state detection cloud-bot generates, based on at least a portion of the first data and at least a portion of the second data, a likelihood (e.g., 30%, 40%, 50%, 60%, and/or the like) the region is in a particular state. For example, the particular state may be a "home" state, an "away" state, a "vacation" state, and/or a "sleep" state. In some embodiments, a cloud-bot processing engine (e.g., cloud-bot processing engine 306) generates the likelihood the region is in a particular state.

In some embodiments, the state detection cloud-bot includes a model. The model may comprise a machine learning model. The machine learning model may be a random forest model (e.g., a random forest regression model). The at least a portion of the first data and the at least a portion of the second data may comprise real-time input(s) for the model, and the likelihood the region is in a particular state may comprise an output of the model.

In step 1308, if the likelihood satisfies a first threshold condition (e.g., between 50% and 70% likelihood) associated with the particular state, the state detection cloud-bot initiates one or more first response actions (e.g., turn the temperature down 2 degrees) of a set of first response actions associated with the first threshold condition. The one or more first response actions may control one or more device actions of at least one Internet-of-Things (IoT) device of a first set of IoT devices. For example, the first response action may instruct another cloud-bot (e.g., a home temperature cloud-bot) to reduce thermostat temperature 2 degrees. In some embodiments, the cloud-bot processing engine initiates the control actions.

In step 1310, if the likelihood satisfies a second threshold condition (e.g., between 70% and 100% likelihood) associated with the particular state, the state detection cloud-bot initiates one or more second response actions (e.g., turn the temperature down 4 degrees) of a set of a second response actions associated with the second threshold condition. The one or more second response actions may control one or more device actions of at least one Internet-of-Things (IoT) device of a second set of IoT devices. For example, the second response action may instruct another cloud-bot (e.g., a home temperature cloud-bot) to reduce thermostat temperature 4 degrees, and/or instruct another cloud-bot (e.g., a security cloud-bot) to lock one or more doors. In some embodiments, the cloud-bot processing engine initiates the control actions.

Figure 14:
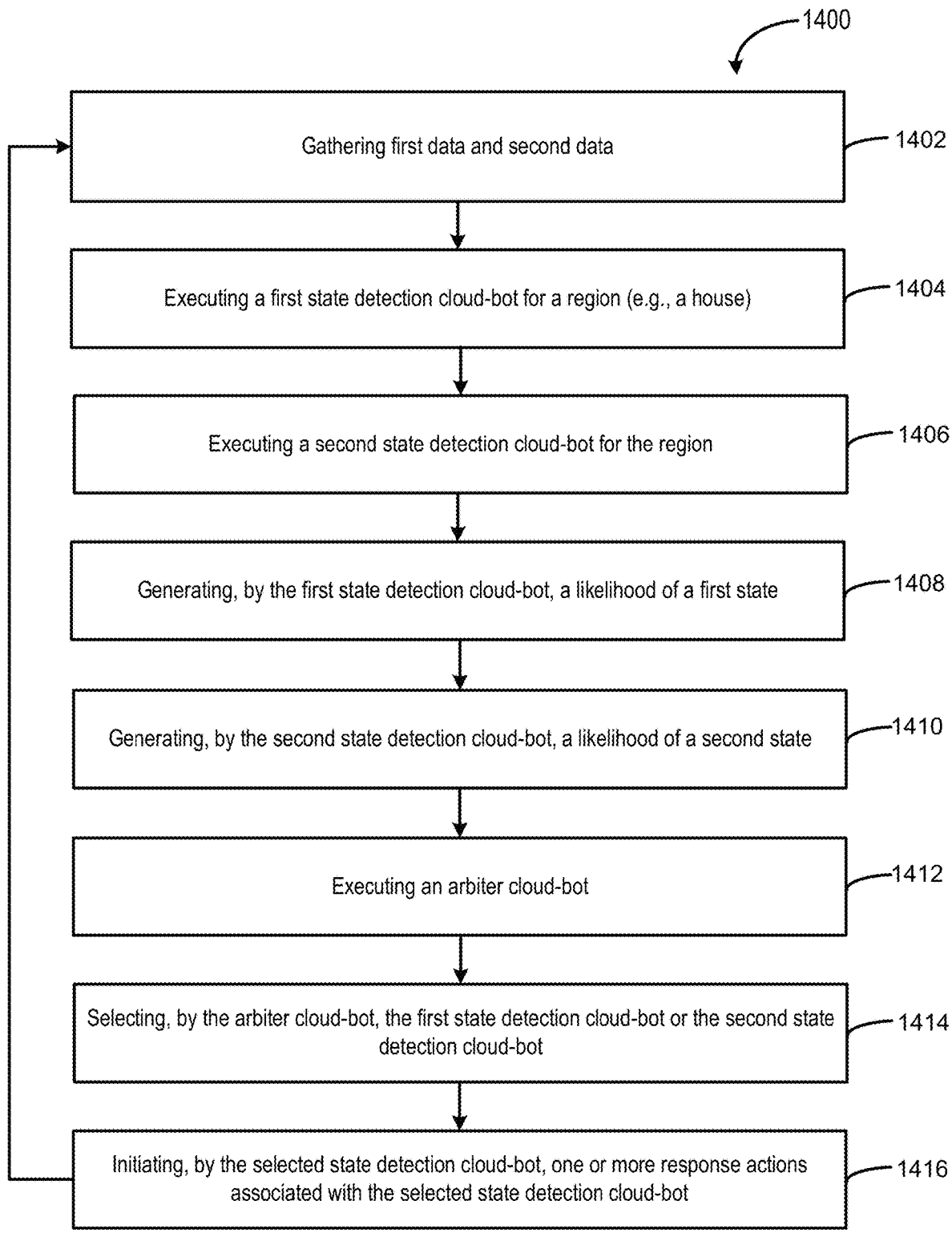
FIG. 14 depicts a flowchart of an example of a method of deployment and operation of an arbiter cloud-bot according to some embodiments.

FIG. 14 depicts a flowchart 1400 of an example of a method of deployment and operation of an arbiter cloud-bot (e.g., arbiter cloud-bot 1210) according to some embodiments.

In step 1402, a cloud-based system (e.g., cloud-bot platform system 102) gathers first data and second data over a communication network (e.g., communications network 108). The first data may detected by a first sensor device deployed in a first sub-region (an entryway) of a region (e.g., a house), and the second data may be detected by a second sensor device deployed in a second sub-region (e.g., a living room) of the region. The first and/or second data may be different sets of IoT data (e.g., raw IoT data 220) and/or other data (e.g., detected by sensor(s) of non-IoT devices). Accordingly, the first and/or second sensor device may be IoT devices (e.g., IoT devices 116) and/or non-IoT devices. For example a non-IoT device may comprise a sensor on a door that detects whether a door has been opened and/or closed. Such a sensor may communicate data locally to another device (e.g., a gateway device and/or IoT device) which may have additionally network connectivity (e.g., Internet connectivity to the communications network 108). In some embodiments, a data gathering engine (e.g., data gathering engine 214) gathers the data.

In step 1404, the cloud-based system executes a first state detection cloud-bot (e.g., home detection cloud-bot 1204). In some embodiments, a deployment engine (e.g., cloud-bot deployment engine 218) executes the first state detection cloud-bot.

In step 1406, the cloud-based system executes a second state detection cloud-bot (e.g., away detection cloud-bot 1206). In some embodiments, the deployment engine executes the second state detection cloud-bot. It will be appreciated that any number of state detection cloud-bots may be executed and/or arbitrated, as discussed herein.

In step 1408, the first state detection cloud-bot generates, based on at least a portion of the first data and/or at least a portion of the second data, a first likelihood (e.g., 30%, 40%, 50%, 60%, and/or the like) the region is in a first state (e.g., home state). In some embodiments, a cloud-bot processing engine (e.g., cloud-bot processing engine 306) generates the likelihood the region is in the first state.

In step 1410, the second state detection cloud-bot generates, based on at least a portion of the first data and/or at least a portion of the second data, a second likelihood (e.g., 30%, 40%, 50%, 60%, and/or the like) the region is in a second state (e.g., away state). In some embodiments, the cloud-bot processing engine generates the likelihood the region is in the second state.

In step 1412, the cloud-based system executes an arbiter cloud-bot (e.g., arbiter cloud-bot 1210). In some embodiments, the deployment engine executes the arbiter cloud-bot. It will be appreciated that any number of state detection cloud-bots may be executed and/or arbitrated by the arbiter cloud-bot.

In step 1414, the arbiter cloud-bot selects the first state detection cloud-bot or the second state detection cloud-bot to determine whether the region is in the first state, the second state, and/or other state (e.g., a transition state). In some embodiments, the arbiter cloud-bot may compare the respective generated likelihoods of the two bots, and select the state with the higher likelihood. For example, if the output of the first cloud-bot is 50% likelihood the region is in a home state, and the output of the second cloud-bot is 70% likelihood the region is in an away state, the arbiter cloud-bot may determine the region in the away state. In some embodiments, the cloud-bot processing engine performs the selection.

In some embodiments, the arbiter cloud-bot may select a particular state detection cloud-bot based on a predetermined prioritization of one or more states over one or more states instead of, or in addition to, comparing outputs of the first and second state detection cloud-bots. For example, an away state may be prioritized over a sleep state. Accordingly, for example, an away state likelihood of 50% may cause an away state detection cloud-bot to be selected over a sleep state likelihood of 70% generated by a sleep detection cloud-bot. In some embodiments, the prioritization may be limited by a threshold. For example, the prioritized state may be selected unless the difference between the respective outputs is greater than 40%. Accordingly, for example, although the away state may be prioritized, if the likelihood of away is 40% and the likelihood of sleep is 90%, the prioritization may be overruled, and the sleep detection cloud-bot may be selected.

In step 1416, the selected cloud-bot initiates on or more response actions associated with the selected cloud-bot. In some embodiments, the cloud-bot processing engine initiates the response actions.

It will be appreciated that an "engine," "system," "datastore," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently. The datastore or database may include cloud storage. It will further be appreciated that the term "or," as used herein, may be construed in either an inclusive or exclusive sense. Moreover, plural instances may be provided for IoT backends, operations, or structures described herein as a single instance.

The datastores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

The systems, methods, engines, datastores, and/or databases described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

The invention claimed is:

1. A cloud-based computing system comprising:
one or more processors; and
memory storing instructions that, when executed by the one or more processors, cause the cloud-based computing system to perform:
storing, by the cloud-based computing system, a set of cloud-bots available for deployment, each of the cloud-bots including a respective service executable by the cloud-based computing system, each of the cloud-bots being selectable to support each of multiple different user accounts, the set of cloud-bots including a state detection cloud-bot, the state detection cloud-bot including a cloud-based service that when executed by the cloud-based computing system monitors for and responds to a trigger state of a region, the trigger state capable of being dependent on data from two or more different Internet-of-Things (IoT) devices managed by two or more different entities;
receiving for a particular user account of the multiple different user accounts selection of the state detection cloud-bot for deployment, the particular user account being associated with a particular region and a set of IoT devices deployed in the particular region;
in response to the selection of the state detection cloud-bot, for the particular user account,
associating, by the cloud-based computing system, a particular instance of the state detection cloud-bot with a first IoT device of the set of IoT devices and with a second IoT device of the set of IoT devices, the first IoT device being managed by a first entity at a first entity backend system remote from the first IoT device and managed by the first entity, the second IoT device being managed by a second entity at a second entity backend system remote from the second IoT device and managed by the second entity, the first entity being different than the second entity, the first IoT device including a first sensor for sensing a first ambient condition of a first type and not of a second type, the second IoT device including a second sensor for sensing a second ambient condition of the second type and not of the first type, the first IoT device configured to send first data on the first ambient condition to the first entity backend system, the second IoT device configured to send second data on the second ambient condition to the second entity backend system;
gathering, by the particular instance of the state detection cloud-bot being executed by the cloud-based computing system, first information based on the first data over a communication network from the first entity backend system, and second information based on the second data over the communication network from the second entity backend system; and
evaluating, by the particular instance of the state detection cloud-bot being executed by the cloud-based computing system, the first information and the second information to determine a likelihood the trigger state has occurred;
if the likelihood satisfies a first threshold condition associated with the trigger state, the first threshold condition indicating a first likelihood of an existence of a particular event or external condition, automatically sending by the particular instance of the state detection cloud-bot being executed by the cloud-based computing system a first device instruction in response to the satisfaction of the first threshold condition to at least one first particular IoT device of the set of IoT devices to control the at least one particular IoT device of the set of IoT devices to switch from a current setting to a new setting; and
if the likelihood satisfies a second threshold condition associated with the trigger state, the second threshold condition indicating a second likelihood of the existence of the particular event or external condition, the second likelihood being less than the first likelihood, automatically sending by the particular instance of the state detection cloud-bot being executed by the cloud-based computing system a second device instruction in response to the satisfaction of the second threshold condition to the at least one particular IoT device of the set of IoT devices to control the at least one particular IoT device of the set of IoT devices to switch from the current setting to an intermediate setting, the intermediate setting being between the current setting and the new setting.

2. The system of claim 1, wherein the particular region corresponds to a building structure, and the first IoT device monitors the first ambient condition in a first sub-region corresponding to an outer-doorway of the building structure, and the second IoT device monitors the second ambient condition in a second sub-region corresponding to one or more rooms of the building structure.

3. The system of claim 1, wherein the state detection cloud-bot comprises a home detection cloud-bot, and the trigger state comprises a home state.

4. The system of claim 1, wherein the state detection cloud-bot comprises a sleep detection cloud-bot, and the trigger state comprises a sleep state.

5. The system of claim 1, wherein the state detection cloud-bot comprises an away detection cloud-bot, and the trigger state comprises an away state.

6. The system of claim 1, wherein the state detection cloud-bot comprises a vacation detection cloud-bot, and the trigger state comprises a vacation state.

7. The system of claim 1, wherein the state detection cloud-bot includes a model, and the first information and the second information comprises real-time input for the model, and the likelihood the particular region is in the trigger state comprises an output of the model.

8. The system of claim 7, wherein the model comprises a machine learning model.

9. The system of claim 8, wherein the machine learning model comprises a random forest machine learning model.

10. The system of claim 1, wherein the second device instruction includes an instruction to adjust a temperature of a thermostat to a transitional temperature between a current temperature and a different temperature.

11. The system of claim 10, wherein the first device instruction includes an instruction to adjust the temperature of the thermostat from the current temperature to the different temperature.

12. A method being implemented by a cloud-based computing system including one or more physical processors and storage media storing machine-readable instructions, the method comprising:

storing, by the cloud-based computing system, a set of cloud-bots available for deployment, each of the cloud-bots including a respective service, each of the cloud-bots being selectable to support each of multiple different user accounts, the set of cloud-bots including a state detection cloud-bot, the state detection cloud-bot including a cloud-based service that monitors for and responds to a trigger state of a region, the trigger state capable of being dependent on data from two or more different Internet-of-Things (IoT) devices managed by two or more different entities;

receiving for a particular user account of the multiple different user accounts selection of the state detection cloud-bot for deployment, the particular user account being associated with a particular region and a set of IoT devices deployed in the particular region;

in response to the selection of the state detection cloud-bot, for the particular user account, associating, by the cloud-based computing system, a particular instance of the state detection cloud-bot with a first IoT device of the set of IoT devices and with a second IoT device of the set of IoT devices, the first IoT device being managed by a first entity at a first entity backend system remote from the first IoT device and managed by the first entity, the second IoT device being managed by a second entity at a second entity backend system remote from the second IoT device and managed by the second entity, the first entity being different than the second entity, the first IoT device including a first sensor for sensing a first ambient condition of a first type and not of a second type, the second IoT device including a second sensor for sensing a second ambient condition of the second type and not of the first type, the first IoT device configured to send first data on the first ambient condition to the first entity backend system, the second IoT device configured to send second data on the second ambient condition to the second entity backend system;

gathering, by the cloud-based computing system, first information based on the first data over a communication network from the first entity backend system, and second information based on the second data over the communication network from the second entity backend system; and evaluating, by the particular instance of the state detection cloud-bot, the first information and the second information to determine a likelihood the trigger state has occurred;

detecting that the likelihood satisfies a first threshold condition associated with the trigger state, the first threshold condition indicating a first likelihood of an existence of a particular event or external condition;

automatically sending a first device instruction in response to the satisfaction of the first threshold condition to at least one particular IoT device of the set of IoT devices to control the at least one particular IoT device of the set of IoT devices to switch from a current setting to a new setting;

detecting that the likelihood satisfies a second threshold condition associated with the trigger state, the second threshold condition indicating a second likelihood of the existence of the particular event or external condition, the second likelihood being less than the first likelihood; and automatically sending a second device instruction in response to the satisfaction of the second threshold condition to the at least one particular IoT device of the set of IoT devices to control the at least one particular IoT device of the set of IoT devices to switch from the current setting to an intermediate setting, the intermediate setting being between the current setting and the new setting.

13. The method of claim 12, wherein the particular region corresponds to a building structure, and the first IoT device monitors the first ambient condition in a first sub-region corresponding to an outer-doorway of the building structure, and the second IoT device monitors the second ambient condition in a second sub-region corresponding to one or more rooms of the building structure.

14. The method of claim 12, wherein the state detection cloud-bot comprises a home detection cloud-bot, and the trigger state comprises a home state.

15. The method of claim 12, wherein the state detection cloud-bot comprises a sleep detection cloud-bot, and the trigger state comprises a sleep state.

16. The method of claim 12, wherein the state detection cloud-bot comprises an away detection cloud-bot, and the trigger state comprises an away state.

17. The method of claim 12, wherein the state detection cloud-bot comprises a vacation detection cloud-bot, and the trigger state comprises a vacation state.

18. The method of claim 12, wherein the state detection cloud-bot includes a model, and the first information and the second information comprises real-time input for the model, and the likelihood the particular region is in the trigger state comprises an output of the model.

19. The method of claim 18, wherein the model comprises a machine learning model.

20. The method of claim 19, wherein the machine learning model comprises a random forest machine learning model.

21. The method of claim 12, wherein the second device instruction includes an instruction to adjust a temperature of a thermostat to a transitional temperature between a current temperature and a different temperature.

22. The method of claim 21, wherein the first device instruction includes an instruction to adjust the temperature of the thermostat from the current temperature to the different temperature.

* * * * *